US011020807B2

(12) United States Patent
Yates et al.

(10) Patent No.: US 11,020,807 B2
(45) Date of Patent: Jun. 1, 2021

(54) HOLE DRILLING JIG APPARATUS

(71) Applicant: Power Box AG, Zug (CH)

(72) Inventors: Adam Yates, Northumberland (GB); Michael Corcoran, Northumberland (GB); Simon Bird, Somerset (GB); Daniel Pikarski, Somerset (GB); Darrell Morris, Somerset (GB); Jon Saunders, Somerset (GB)

(73) Assignee: Power Box AG, Zug (CH)

( * ) Notice: Subject to any disclaimer, the term of this patent is extended or adjusted under 35 U.S.C. 154(b) by 0 days.

(21) Appl. No.: 16/000,982

(22) Filed: Jun. 6, 2018

(65) Prior Publication Data
US 2018/0345385 A1    Dec. 6, 2018

(30) Foreign Application Priority Data

Jun. 6, 2017   (GB) ...................................... 1708973
Aug. 21, 2017  (GB) ...................................... 1713358

(51) Int. Cl.
*B23B 47/28* (2006.01)
*B25B 5/08* (2006.01)
*B25B 5/16* (2006.01)

(52) U.S. Cl.
CPC ............ *B23B 47/287* (2013.01); *B25B 5/082* (2013.01); *B25B 5/163* (2013.01); *B25B 5/166* (2013.01); *B23B 47/28* (2013.01); *B23B 2247/10* (2013.01); *B23B 2247/12* (2013.01); *B23B 2260/004* (2013.01); *B23B 2260/088* (2013.01)

(58) Field of Classification Search
CPC .............. B23B 47/287; B23B 2247/10; B23B 2247/12; B23B 2260/004; B23B 2260/088; B23B 47/28; B23B 49/023; B25B 5/082; B25B 5/163; B25B 5/166
See application file for complete search history.

(56) References Cited

U.S. PATENT DOCUMENTS

| 2,211,634 | A | * | 8/1940 | Baker | ..................... B23B 47/28 |
|           |   |   |        |       | 408/115 R |
| 4,257,166 | A | * | 3/1981 | Barker | .................. B23B 47/287 |
|           |   |   |        |        | 33/667 |
| 4,474,514 | A | * | 10/1984 | Jensen | .................. B23B 47/287 |
|           |   |   |         |        | 408/115 B |

(Continued)

Primary Examiner — Eric A. Gates
Assistant Examiner — Paul M Janeski
(74) Attorney, Agent, or Firm — Woodard, Emhardt, Henry, Reeves & Wagner, LLP

(57) ABSTRACT

The current invention relates to jig apparatus which is provided of a form to allow accurate positioning and repositioning of the same with respect to workpiece and the use of the jig apparatus to provide a guide for the provision of a drill bit through at least one guide passages therein to form a hole in the workpiece at a required location. In one embodiment the jig apparatus is provided in a form so as to provide a plurality of passages, each of which can be used as a guide for a drill bit to thereby allow a plurality of spaced apart drill holes to be formed in the workpiece without the need to move the jig apparatus with respect to the workpiece. In one embodiment guide means are provided which are selectively positionable by the user in order to allow the position of the jig apparatus with respect to the workpiece to be accurately defined and retained by the user.

5 Claims, 29 Drawing Sheets

(56) References Cited

U.S. PATENT DOCUMENTS

| | | | | |
|---|---|---|---|---|
| 4,952,101 A * | 8/1990 | Coombs | ................ | B23B 47/287 33/667 |
| 5,676,500 A * | 10/1997 | Sommerfeld | ......... | B23B 47/287 408/103 |
| 7,134,814 B1 * | 11/2006 | Park | ...................... | B23B 47/287 408/103 |
| 7,798,750 B2 * | 9/2010 | Clark | .................... | B23B 47/287 408/103 |
| 8,882,409 B2 * | 11/2014 | Clark | .................... | B23B 49/02 408/1 R |

* cited by examiner

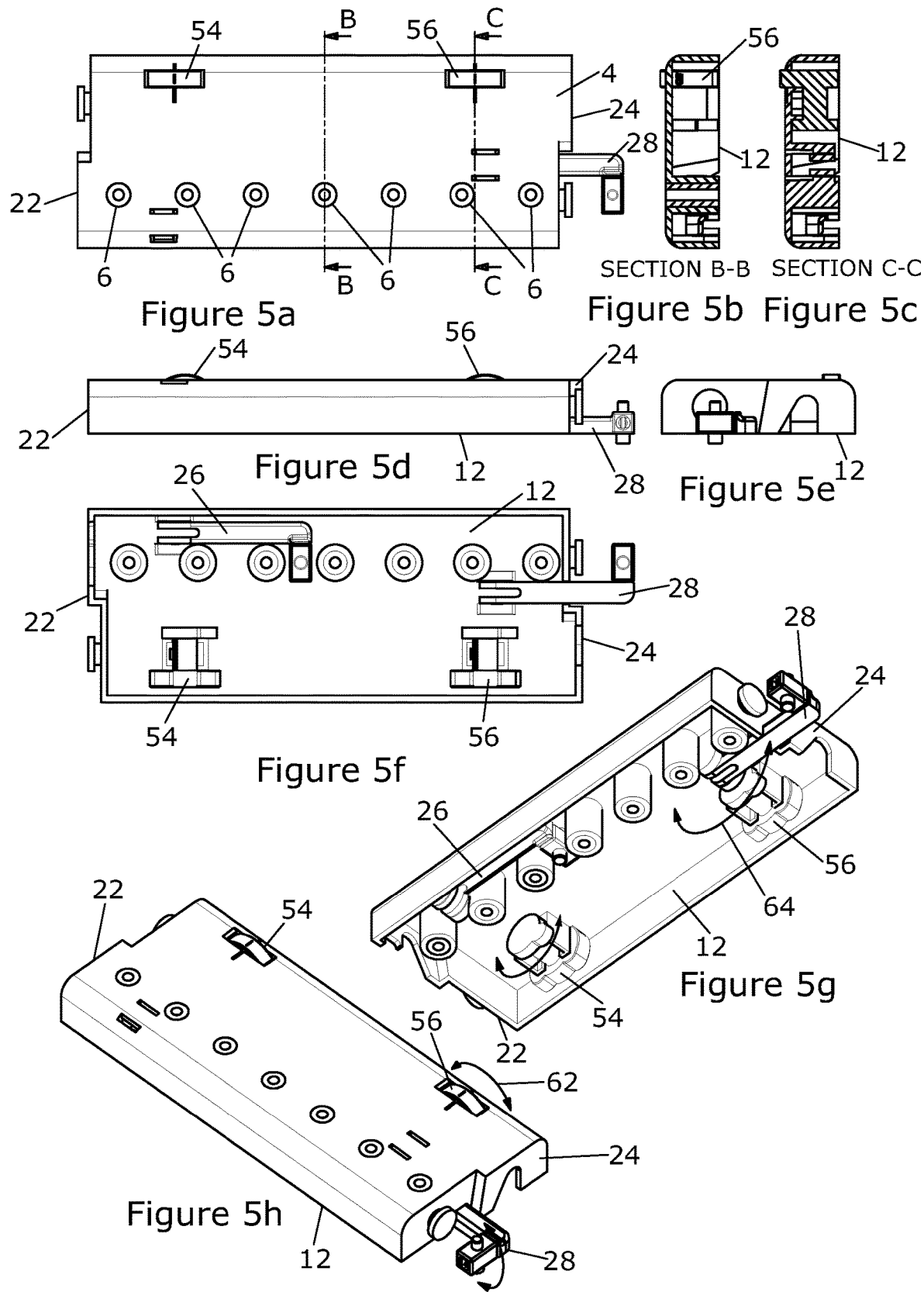

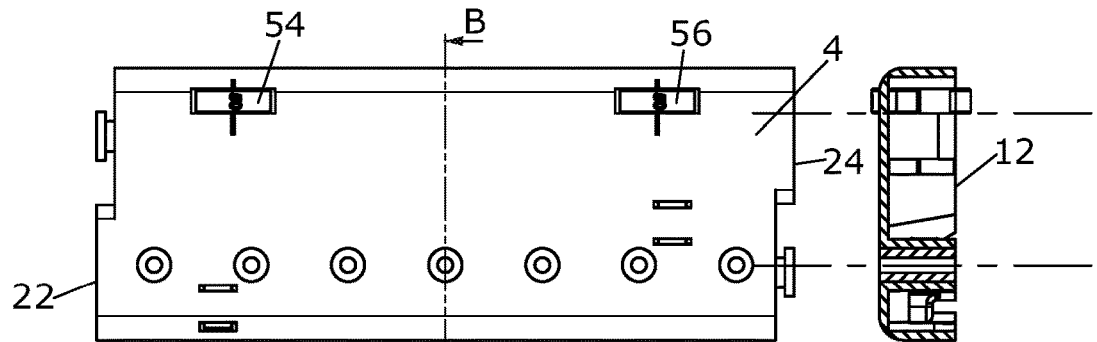
Figure 8a   Figure 8b SECTION B-B
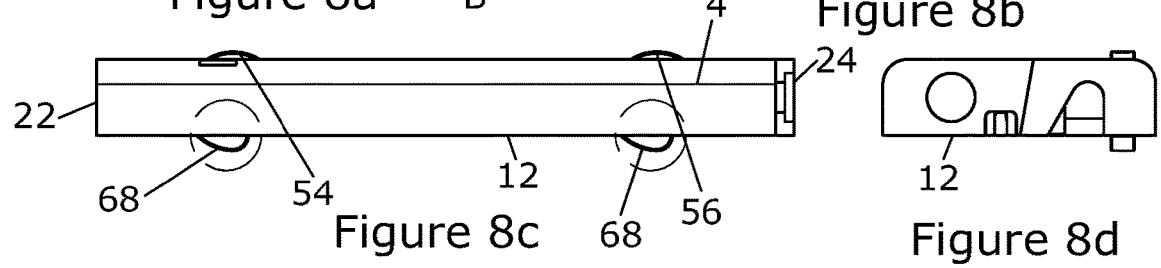
Figure 8c   Figure 8d
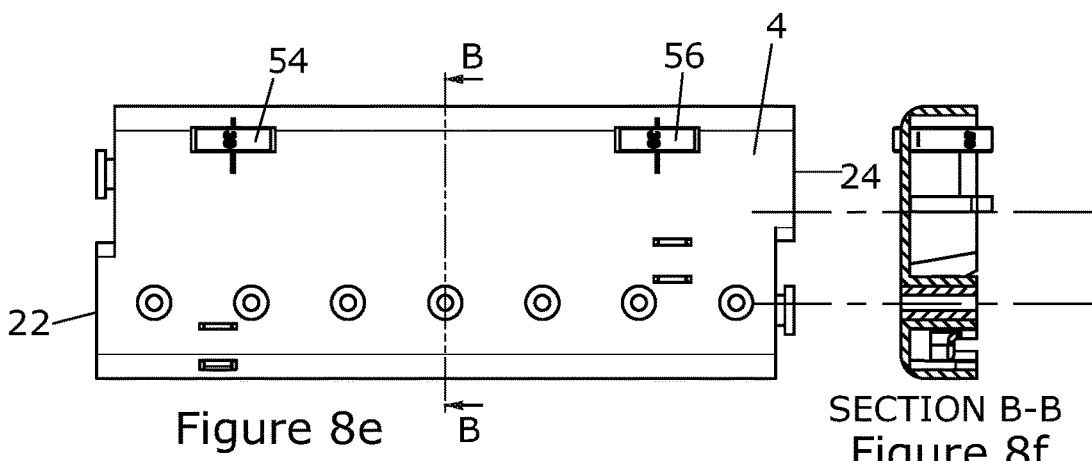
Figure 8e   Figure 8f SECTION B-B
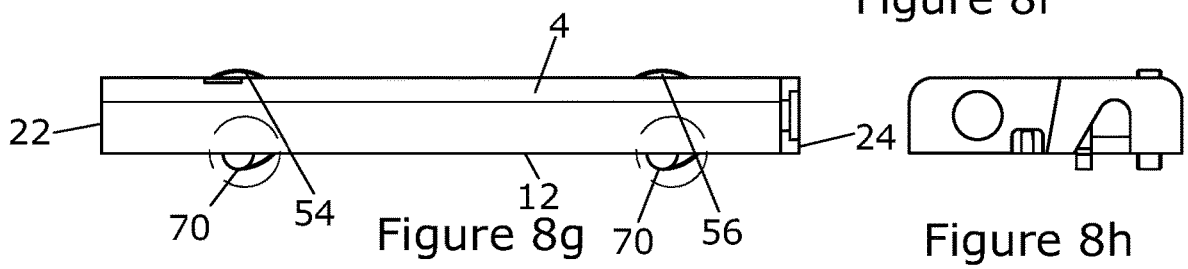
Figure 8g   Figure 8h
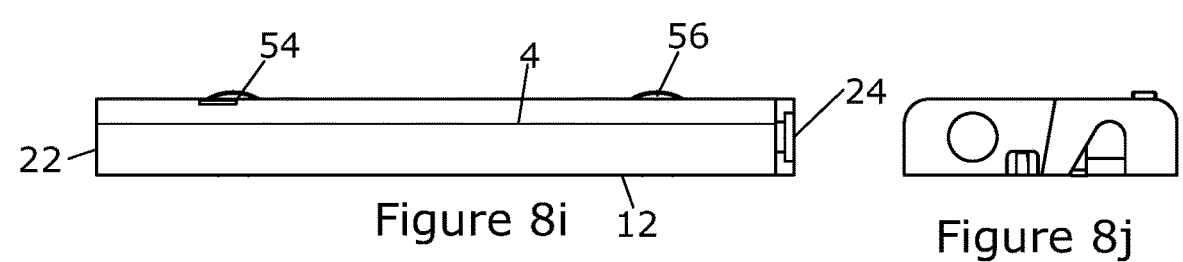
Figure 8i   Figure 8j

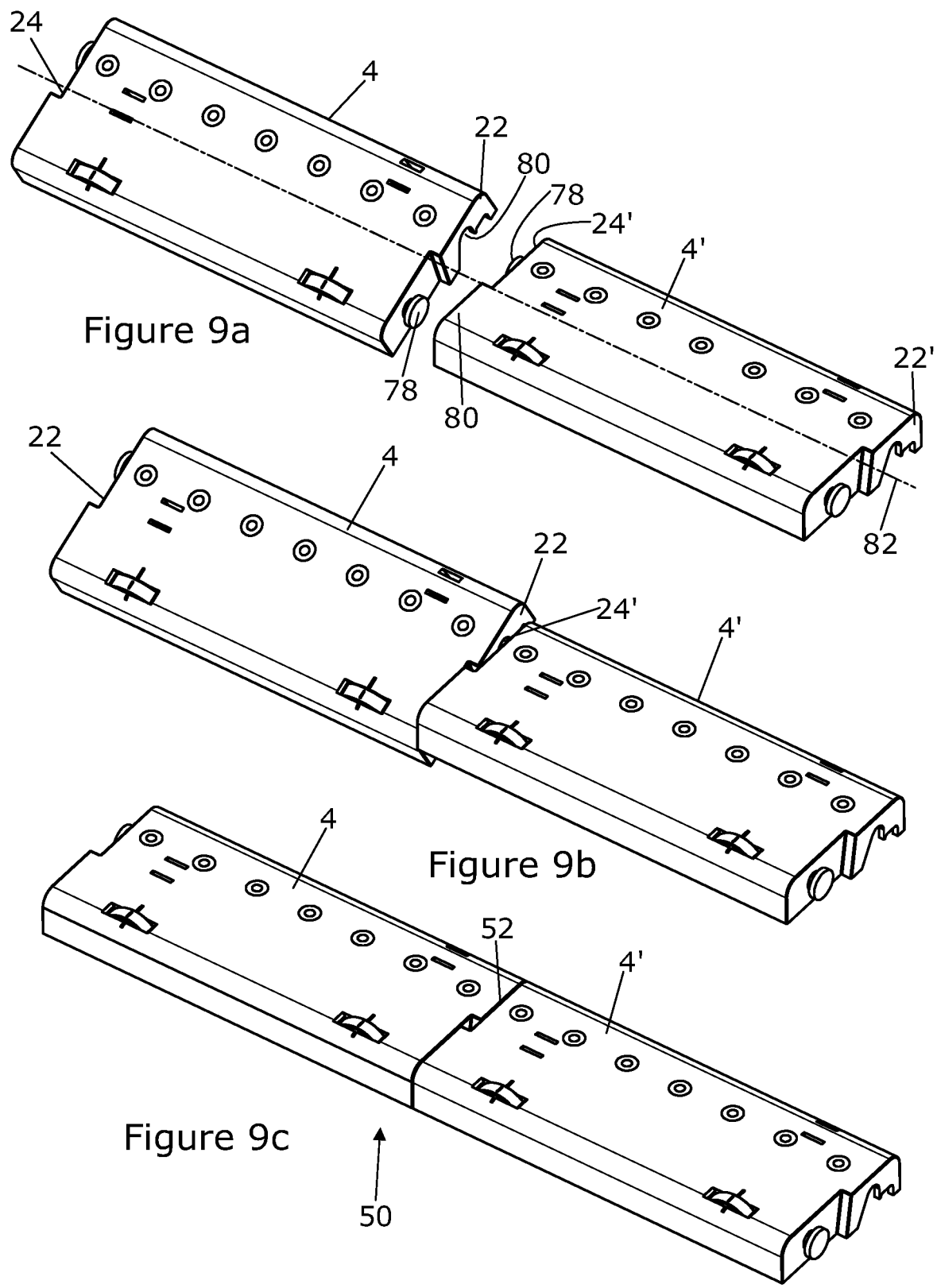

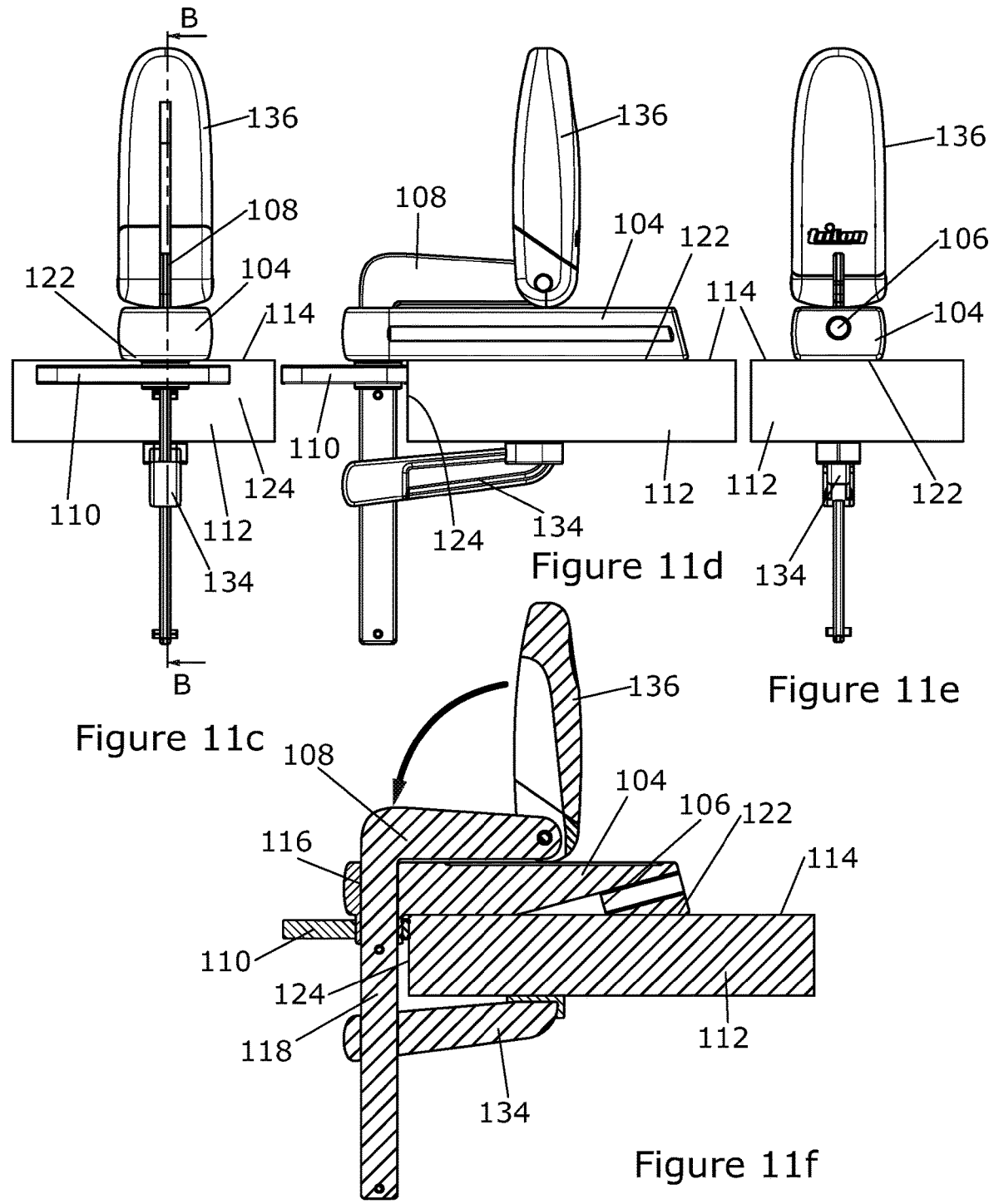

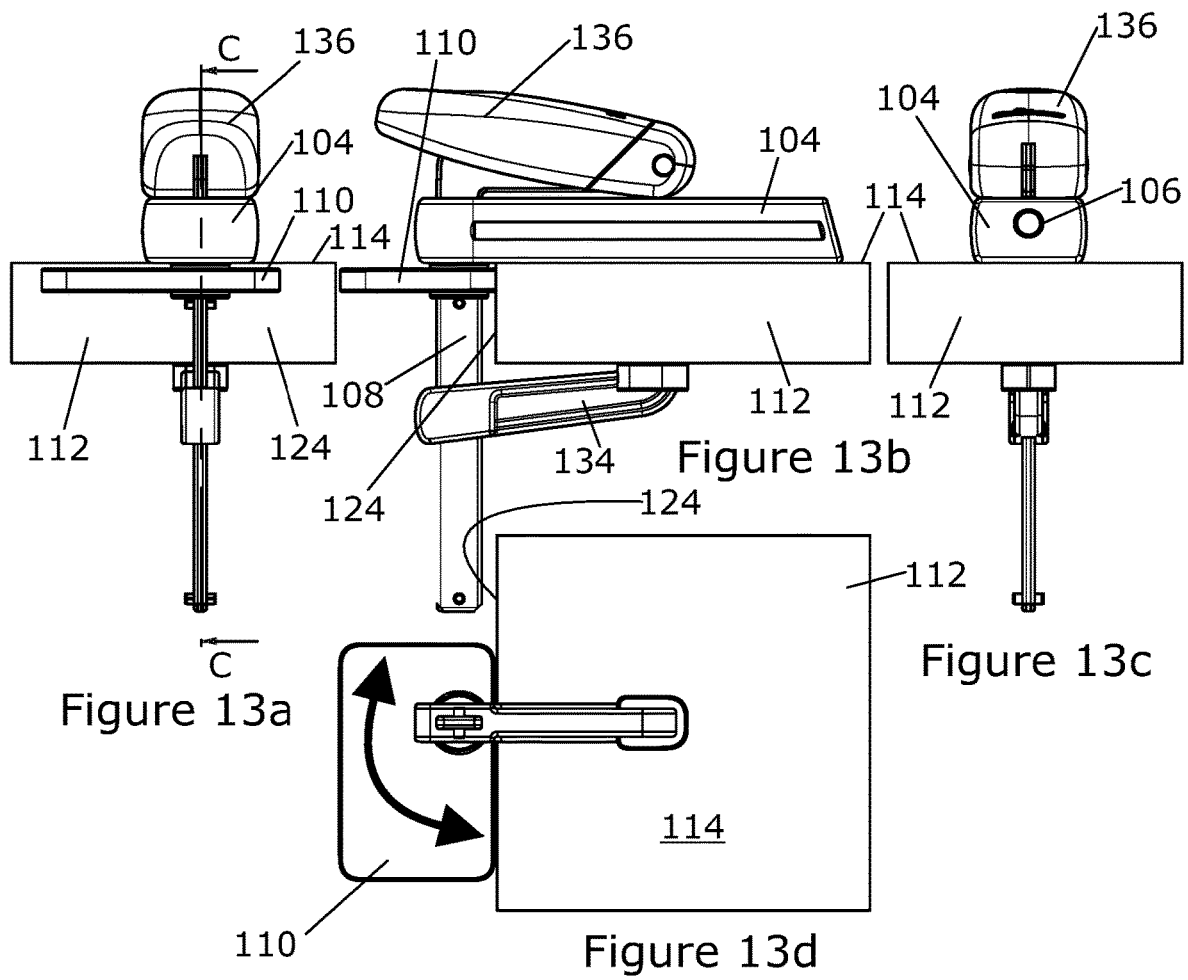
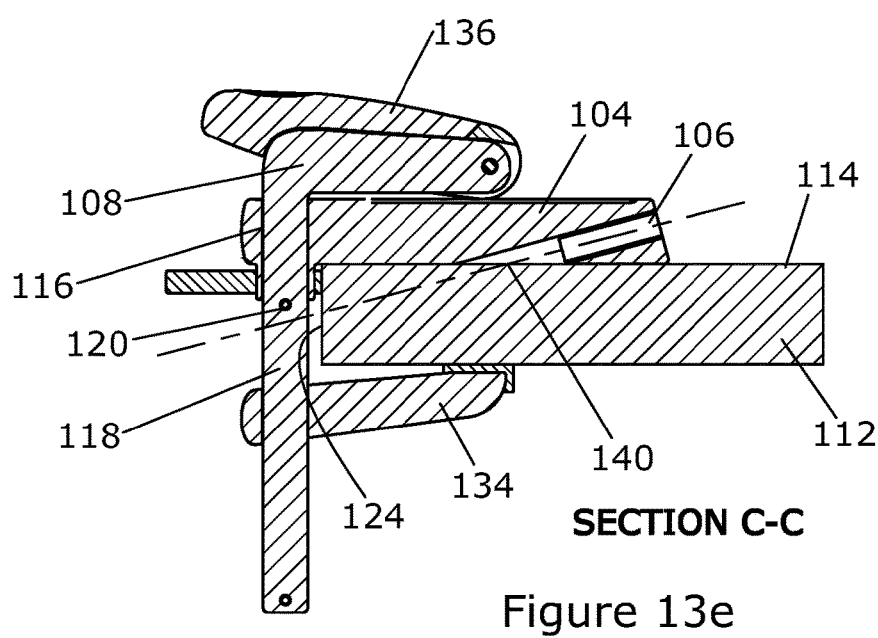

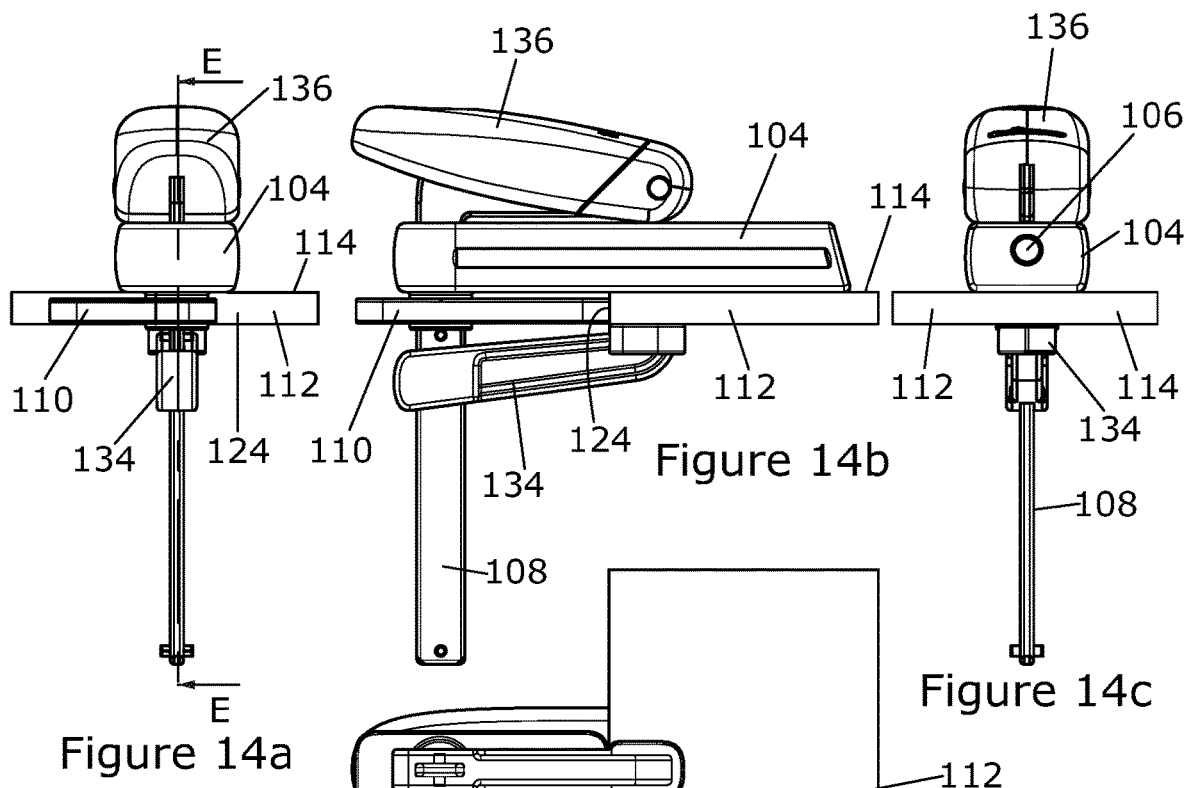
Figure 14a
Figure 14b
Figure 14c
Figure 14d
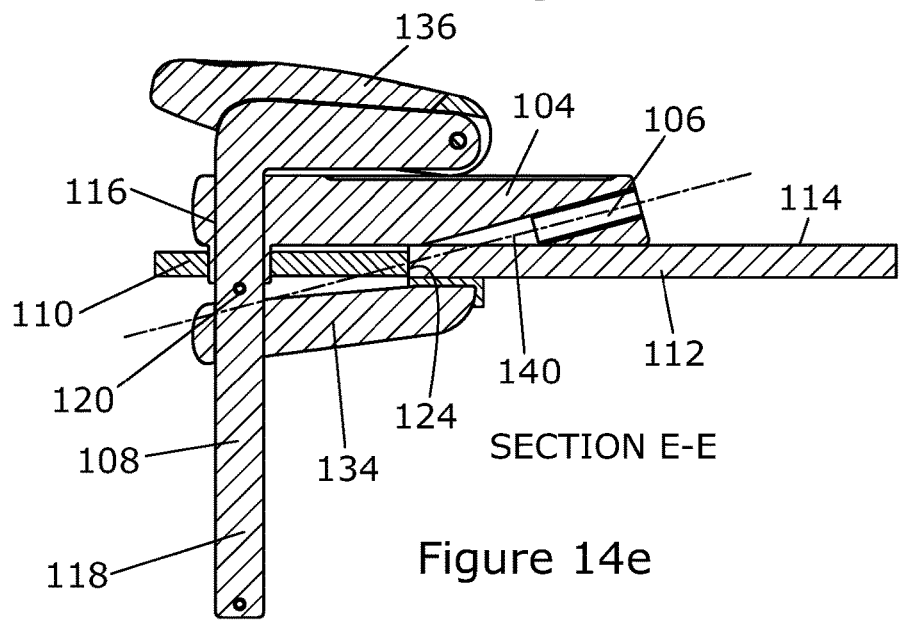
SECTION E-E
Figure 14e

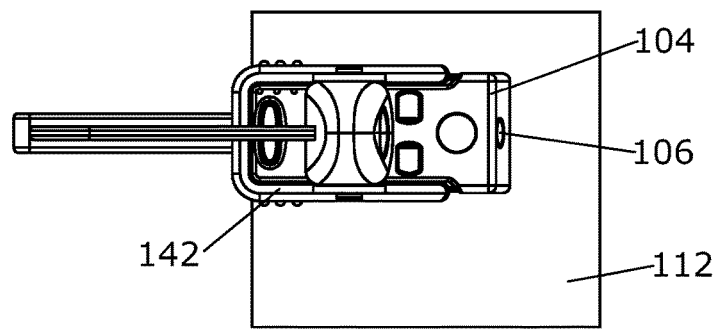
Figure 16c
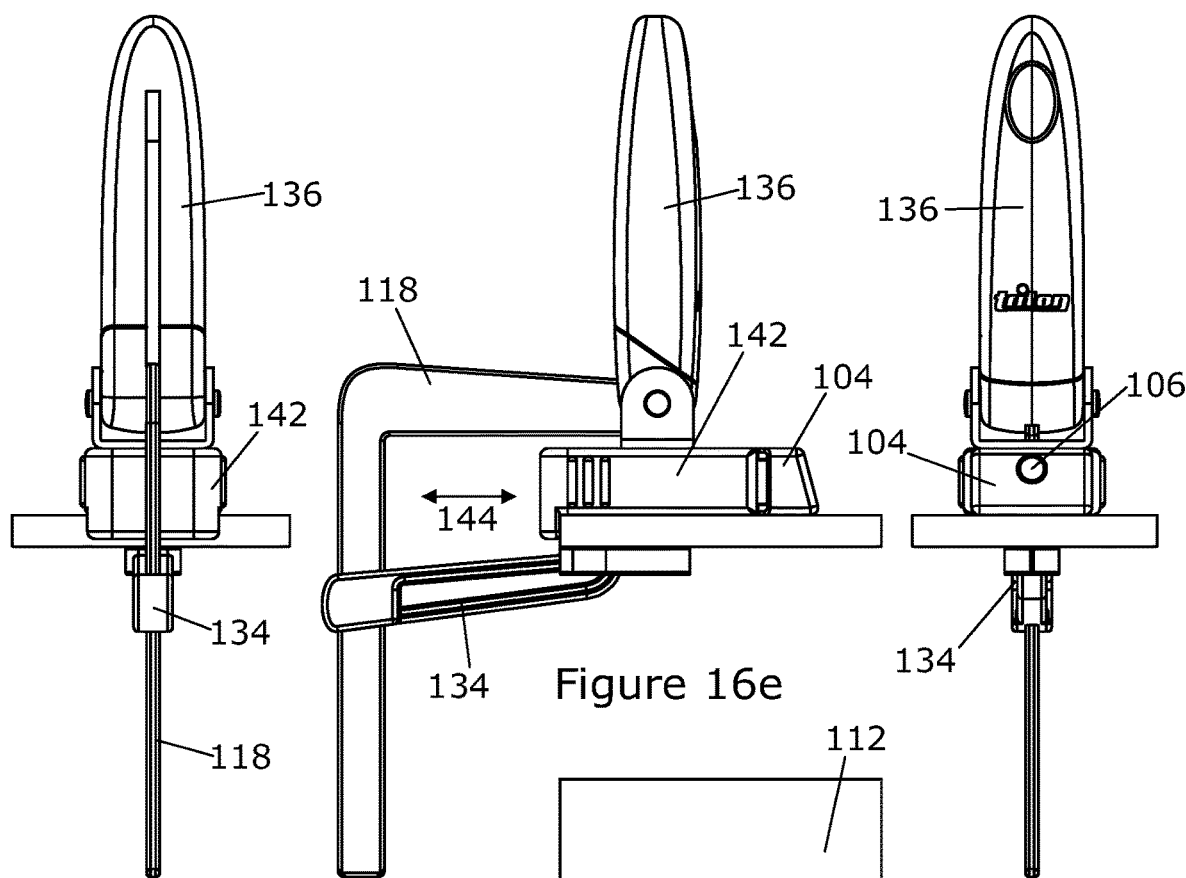
Figure 16d
Figure 16e
Figure 16f
Figure 16g

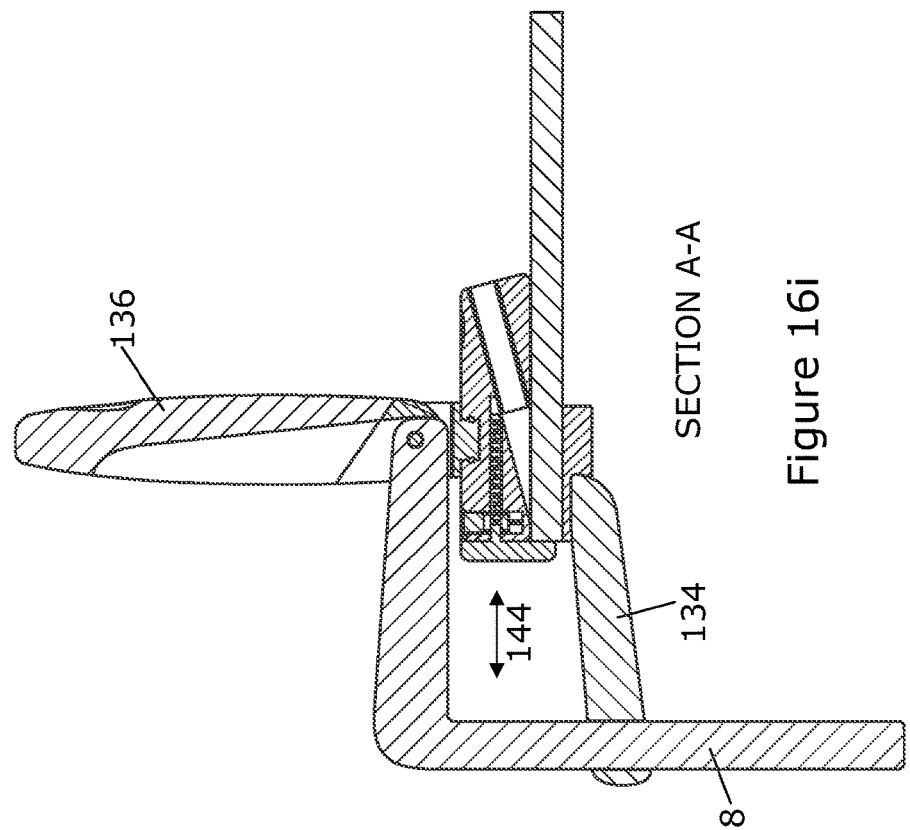
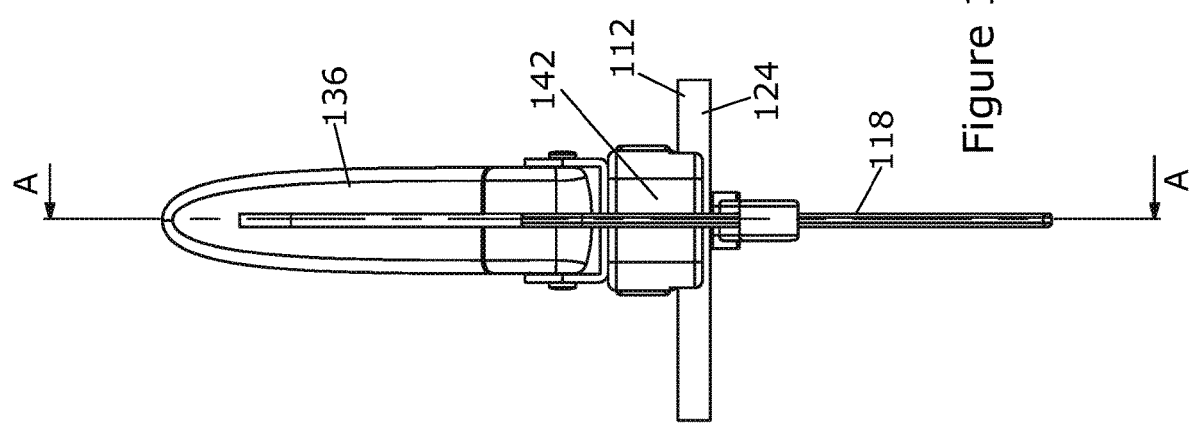
Figure 16i
Figure 16h

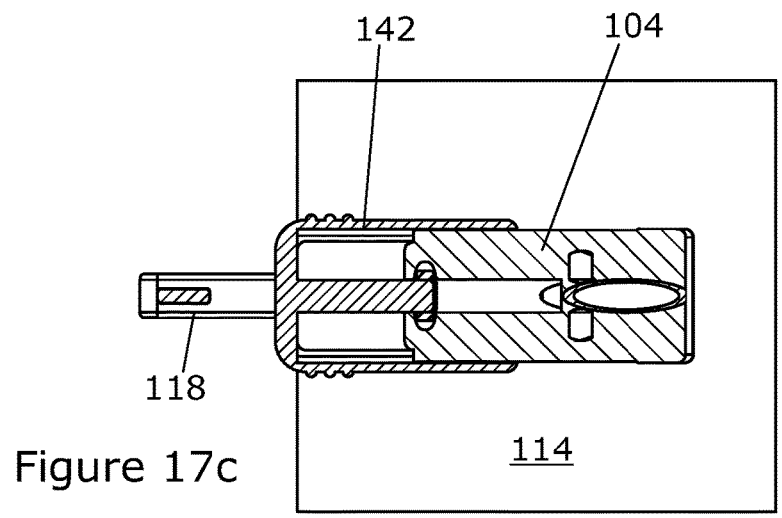
SECTION E-E
Figure 17c
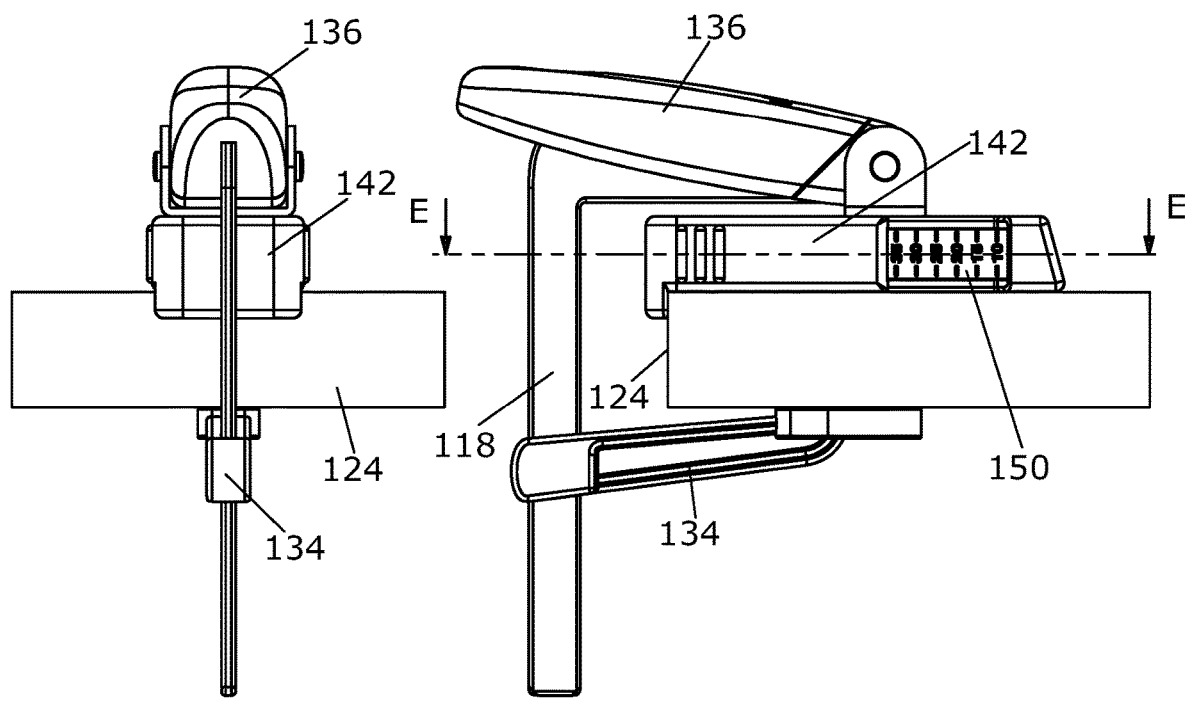
Figure 17a
Figure 17b

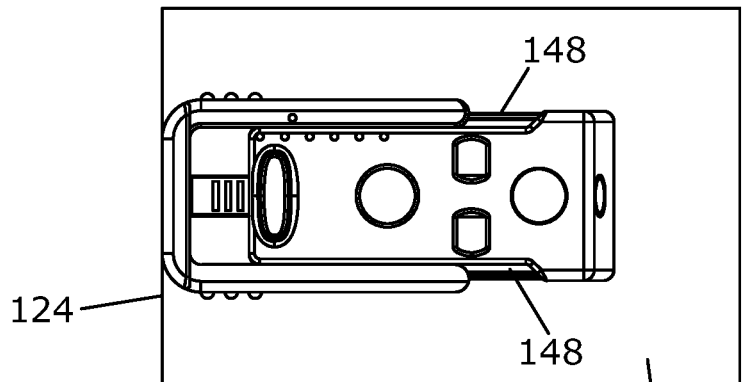
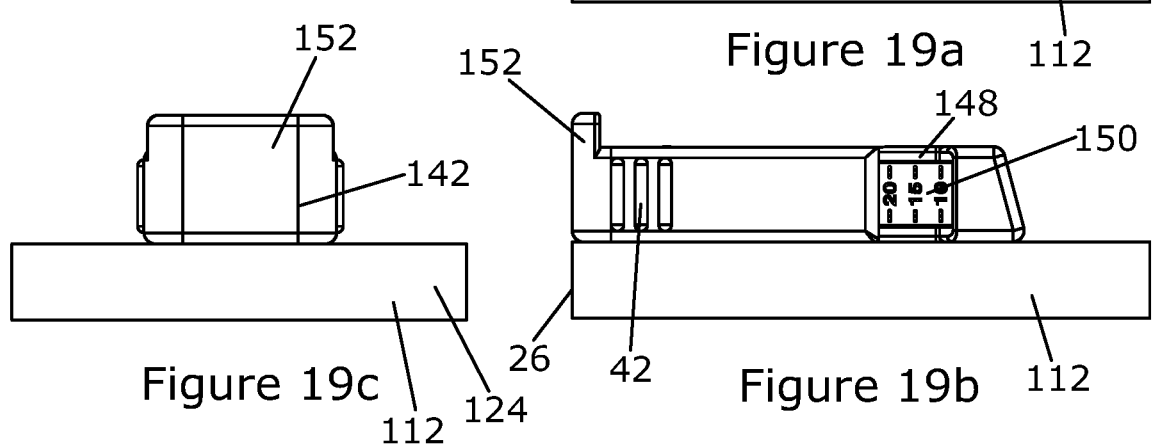
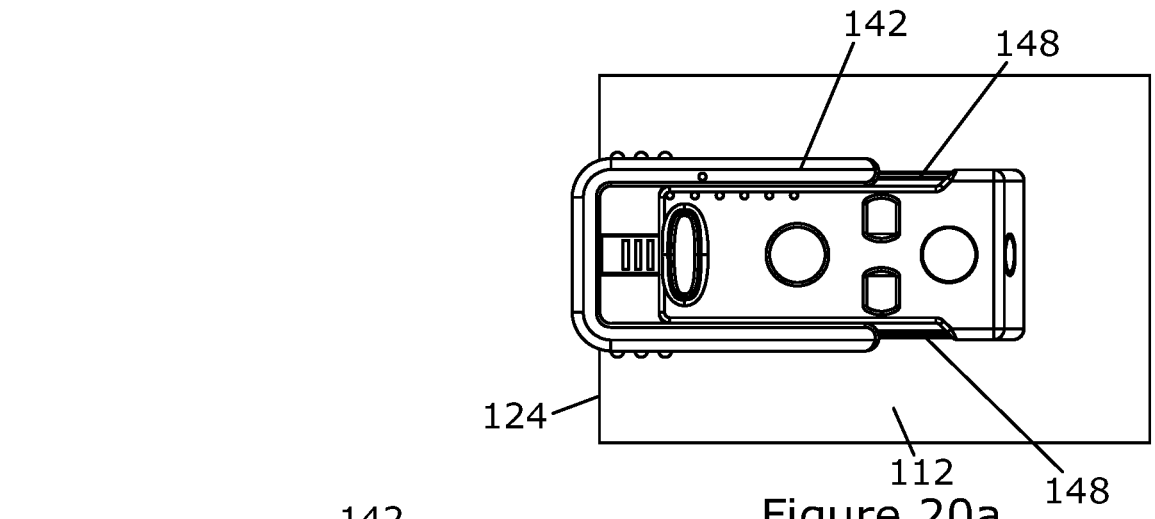
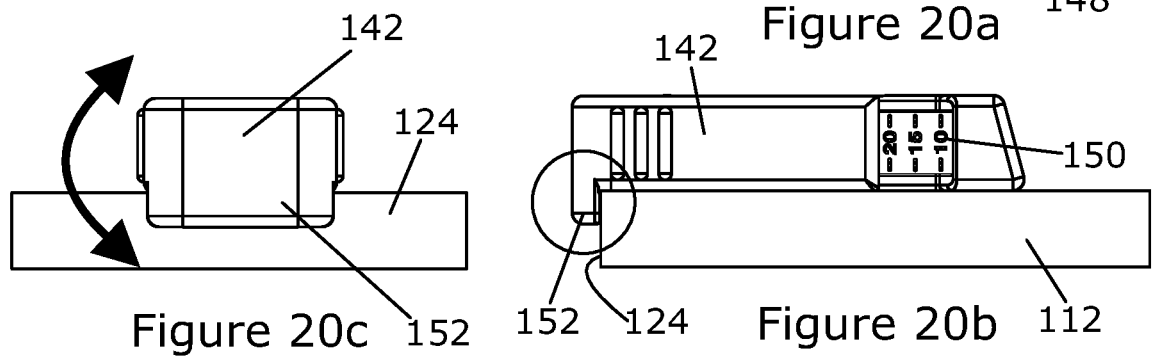

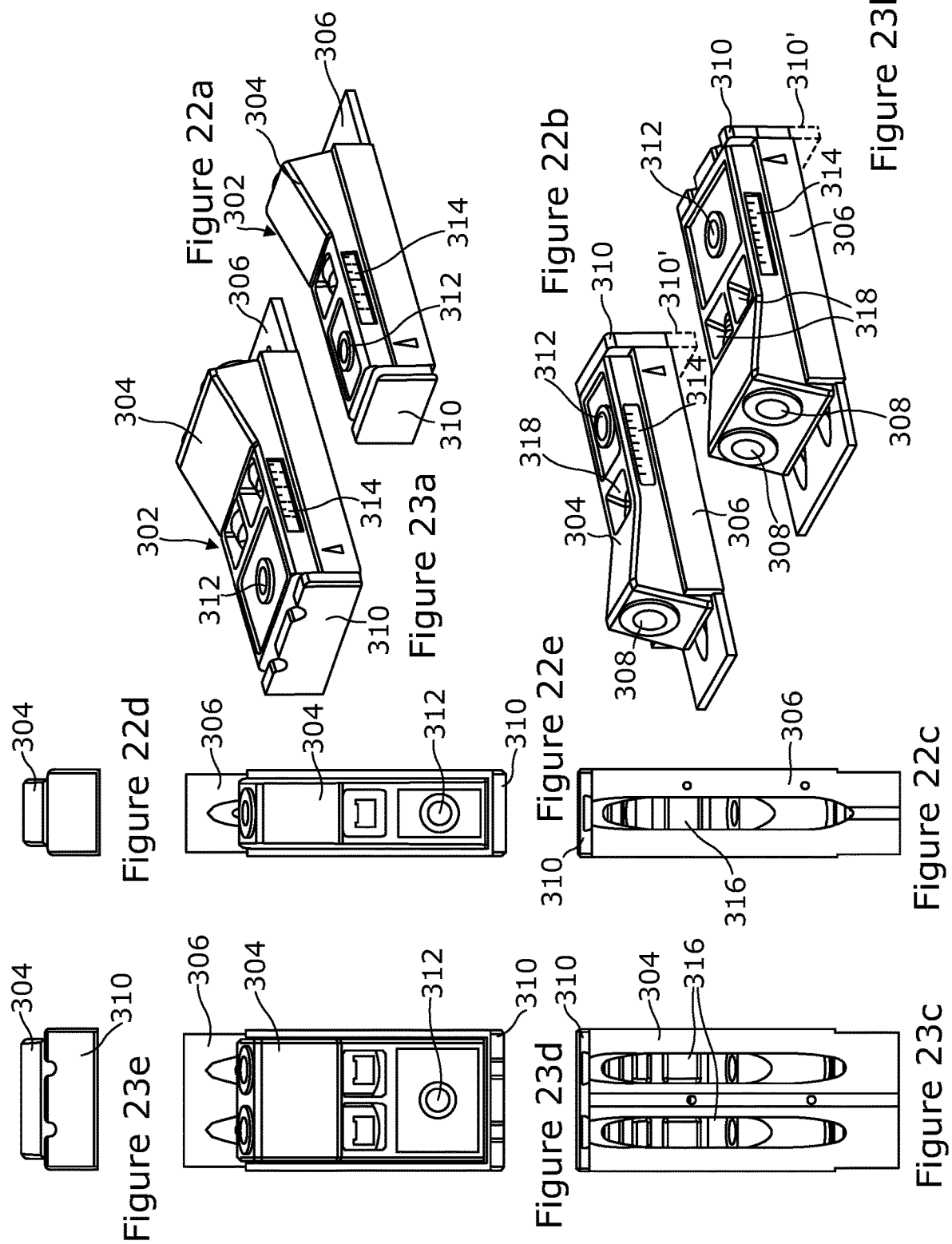

HOLE DRILLING JIG APPARATUS

FIELD OF THE INVENTION

The invention to which this application relates is jig apparatus for use with a power tool apparatus of the type which can be used to form holes in a workpiece and in particular, although not necessarily exclusively, to form holes in a workpiece in a particular position and/or orientation with respect to the surface of the workpiece and/or the body of the workpiece.

BACKGROUND

In workpieces of many types and uses there is a need to be able to accurately produce holes therein in order to ensure that fixing means such as screws which are received therein pass through the workpiece at the desired angle and location so as to allow the same to be used to attach the workpiece to another workpiece or another item in the desired manner.

One example of this is with regard to workpieces which are used as part of furniture carcasses or shelving units and in which the shelves are typically required to be provided and supported at various heights, with the customer often given the flexibility to place shelf support pins in an array of holes according to their needs. In order to enable makers of such carcasses to form the shelf support holes accurately and quickly and quickly at the required locations and spacings there is a need for a relatively fast, and typically blind-hole forming procedure to be used which allows the holes to be positioned in order to allow the subsequent user of the apparatus to be able to insert pins, typically of a 5 mm or ¼" diameter depending on the geographical region of use and so that the pins can be selectively inserted and received in a push-fit manner in the blind holes. The shelf can then simply be rested on the series of protruding pins.

However it is found that conventional jig apparatus, if any is used at all, tends to be relatively complex to use, time consuming to use and/or is not particularly accurate, thereby leading to the shelf being unevenly supported when located on the pins which have been inserted into a set of holes which are intended to provide a level support for the shelf.

Another example of the formation of holes in workpieces is the formation of a pocket hole to receive a screw therethrough. The pocket hole is drilled at an acute angle, such as 10-20 degrees, to a face of the workpiece. In this example the hole is formed in such a way that in one drilling operation there is provided a sub-surface pocket for the screw head, a shoulder for the screw head to bear on and a narrower blind pilot hole to guide a self-cutting screw through the edge of the workpiece in order to join that workpiece to another workpiece.

BRIEF SUMMARY

Conventionally, the drilling of this form of hole is performed in conjunction with a jig which includes a tubular steel drill guide and the jig is clamped to the workpiece in a position such that the end of the drill guide which is adjacent the workpiece is located at the required point of entry of the drill into the workpiece. The guide therefore guides the movement of the stepped drill as it is driven to rotate into the workpiece at an acute angle so as to form a hole of a suitable depth and at the required, controlled, angle.

The use of pocket holes is most commonly in the formation of joints between workpieces by inserting the screw into position in the pocket hole which has been drilled and then driving the screw into the other workpiece which is held with the workpiece in which the hole is drilled. The screw or screws can also be in association with an adhesive which is located along the joint between the respective workpieces. However even when the adhesive is not used, the joint which is formed is solid as soon as the screw is tightened, and there is no need for clamping of the workpieces or waiting for adhesives to cure.

Conventionally, the rotating stepped drill is plunged linearly along its longitudinal axis into and through the tubular metal drill guide in the jig with the jig positioned on the surface of the workpiece to form the hole. Once the hole is formed the jig can be moved and fitted elsewhere on the workpiece and the procedure is repeated until all the required pocket holes are formed at their respective locations on the workpiece. This can be a laborious and time consuming process and which can lead, on occasion, to the user discarding the jig and trying to drill the holes unguided which can lead to inaccuracy and potentially hazardous joints being formed and/or hazardous operation of the drill when forming the pocket holes.

An aim of the present invention is therefore to provide apparatus and a method which allows for the improved formation of one or a series of holes in a workpiece. A further aim is to provide the apparatus in a manner to allow the same to be of particular use in the formation of a series of holes for the selective receipt of support pins. A further aim of the present invention is to provide a jig apparatus which allows the accuracy of the holes which are formed to be at least maintained and preferably improved in comparison to the use of the conventional jig apparatus whilst, at the same time, optimising the process and thereby speeding up the process of drilling multiple pocket holes.

In a first aspect of the invention there is provided a jig apparatus for use with a drill bit and power means therefor to rotate said drill bit to form a hole in a workpiece with which the jig apparatus is positioned wherein said jig includes a body portion and a series of passages at spaced intervals are provided in the body and through which the drill bit can be selectively inserted and into the workpiece to form the said holes in the workpiece and wherein the jig apparatus includes one or more guides to allow the jig apparatus body to be selectively positioned with respect to an edge of the workpiece.

In one embodiment the said guide means are movable between an use position in which a portion of the same is contactable with an edge of the workpiece so as to locate the body with the workpiece and a storage position.

In one embodiment the jig apparatus includes at least one end thereof, but most typically at both, opposing ends, engagement features which allow respective bodies to be joined together to form a combined body of the required length so as to allow a series of passages to be provided therealong.

In one embodiment clamping means are provided which, in one embodiment, comprise a clamp plate which lies to the side of the workpiece which opposes the body, a connecting lever which extends from the clamp plate to the top surface of the body and engages with the body, and a cam lever.

Typically the cam lever is formed and is rotatable with respect to the body so as to selectively engage and disengage the workpiece with the body.

In one embodiment the body passages include sleeves therein which are relatively hard wearing and thereby resist wear from the drill bit as it passes therethrough.

In one embodiment the guides are acted upon by adjustment means which allow the adjustment of the body with respect to the edge of the workpiece in which the holes are to be formed.

In a further aspect of the invention there is provided a jig apparatus for use to provide a guided drilling operation by a driven rotating drill when used in conjunction with the jig apparatus, said jig apparatus including a body and a guide channel along which the drill is moved and wherein the jig apparatus further includes a clamp and guide means including at least one movable gauge assembly including a gauge plate.

In one embodiment the gauge plate is movable by being rotatable relative to the body. In an alternative embodiment the gauge plate is movable by being slidable relative to the body.

In one embodiment a plurality of gauge plates are provided which can be selectively used depending on the required positioning of the jig apparatus on the workpiece and/or the depth of the workpiece.

In one embodiment the clamp which is provided is a friction clamp.

In one embodiment the drill guide provided along the passage is formed of one or more portions of tubular steel.

In one embodiment the gauge plate is adjustable between a plurality of user selectable positions which, in one embodiment, are predefined settings.

In a further aspect of the invention there is provided jig apparatus for use to provide a guided drilling operation by a driven rotating drill when used in conjunction with the jig apparatus, said jig apparatus including a body and at least one channel along which the drill can be introduced and moved therealong and into the workpiece and wherein the jig apparatus includes a guide means such that relative movement between the body and guide means allows the position of the body with respect to an edge of the workpiece to be selected.

In one embodiment the guide means comprise a part which is selectively positionable in any one of a range of receiving means provided in the body so as to allow the position of the body with respect to the workpiece edge to be defined when the jig apparatus is located with the workpiece.

In one embodiment the said receiving means are a series of ports in the body provided along a longitudinal axis of the body.

In one embodiment the part includes first and second leg portions and a gripping portion and the legs pass through respective ports along an axis substantially perpendicular to said longitudinal axis.

In one embodiment the free ends of said leg portions protrude from the said ports to form the guide means against which the edge of the workpiece is contacted so as to provide the workpiece at the desired location with respect to the jig apparatus.

In another embodiment the jig apparatus includes a tray portion with which the body is selectively positioned and engaged.

Typically the tray includes the guide means which are selectively positionable therewith via releasable engagement means so as to allow the guide means to be moved between a storage position and an in use guiding position to be placed against an edge of the workpiece.

There is therefore provided in accordance with the invention jig apparatus which is provided of a form to allow for the faster and more accurate positioning, clamping and repositioning of the same.

BRIEF DESCRIPTION OF THE DRAWINGS

Specific embodiments of the invention are now described; wherein

FIGS. 5*a*-*h* illustrate views of a body of the jig apparatus in accordance with a second embodiment of the invention;

FIGS. 8*a*-*j* illustrate the body portion of FIGS. 5*a*-7*b* in different configurations of use respectively;

FIGS. 9*a*-*c* illustrate the manner in which the body portions can be joined together selectively;

FIGS. 11*a*-*f* illustrate the jig apparatus of FIGS. 10*a*-*b* in a position before clamping;

FIGS. 13*a*-*e* illustrate views of the jig apparatus in accordance with the embodiment of FIGS. 10*a*-12 in a first setting configuration;

FIGS. 14*a*-*e* illustrate views of the jig apparatus in accordance with the embodiment of FIGS. 10*a*-12 in a second setting configuration;

FIGS. 16*a*-*i* illustrate a yet further embodiment of a jig apparatus in accordance with the invention before clamping;

FIGS. 17*a*-*c* illustrate views of the jig apparatus in accordance with the embodiment of FIGS. 16*a*-*i* in a first setting configuration;

FIGS. 19*a*-*c* and 20*a*-*c* illustrate views of a clamp in accordance with the embodiment of FIGS. 16*a*-18 in two possible guide plate setting configuration;

FIGS. 22*a*-*e* and FIGS. 23*a*-*e* illustrate one and two channel versions of a further embodiment of a jig apparatus in accordance with the invention.

DETAILED DESCRIPTION OF THE DRAWINGS

Figure 1:
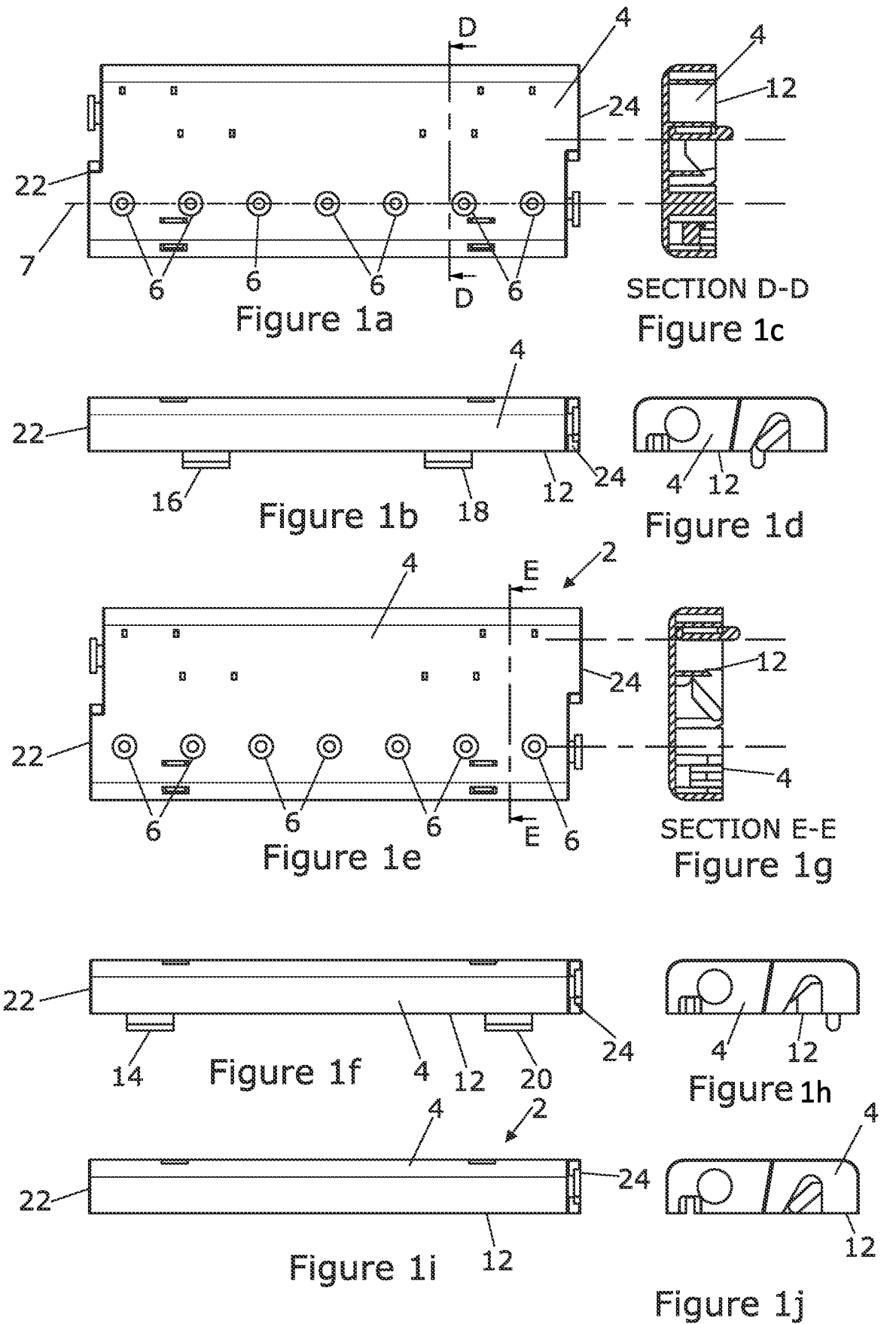
FIGS. 1*a*-*j* illustrate views of a body of the jig apparatus in accordance with a first embodiment of the invention.
Figure 2:
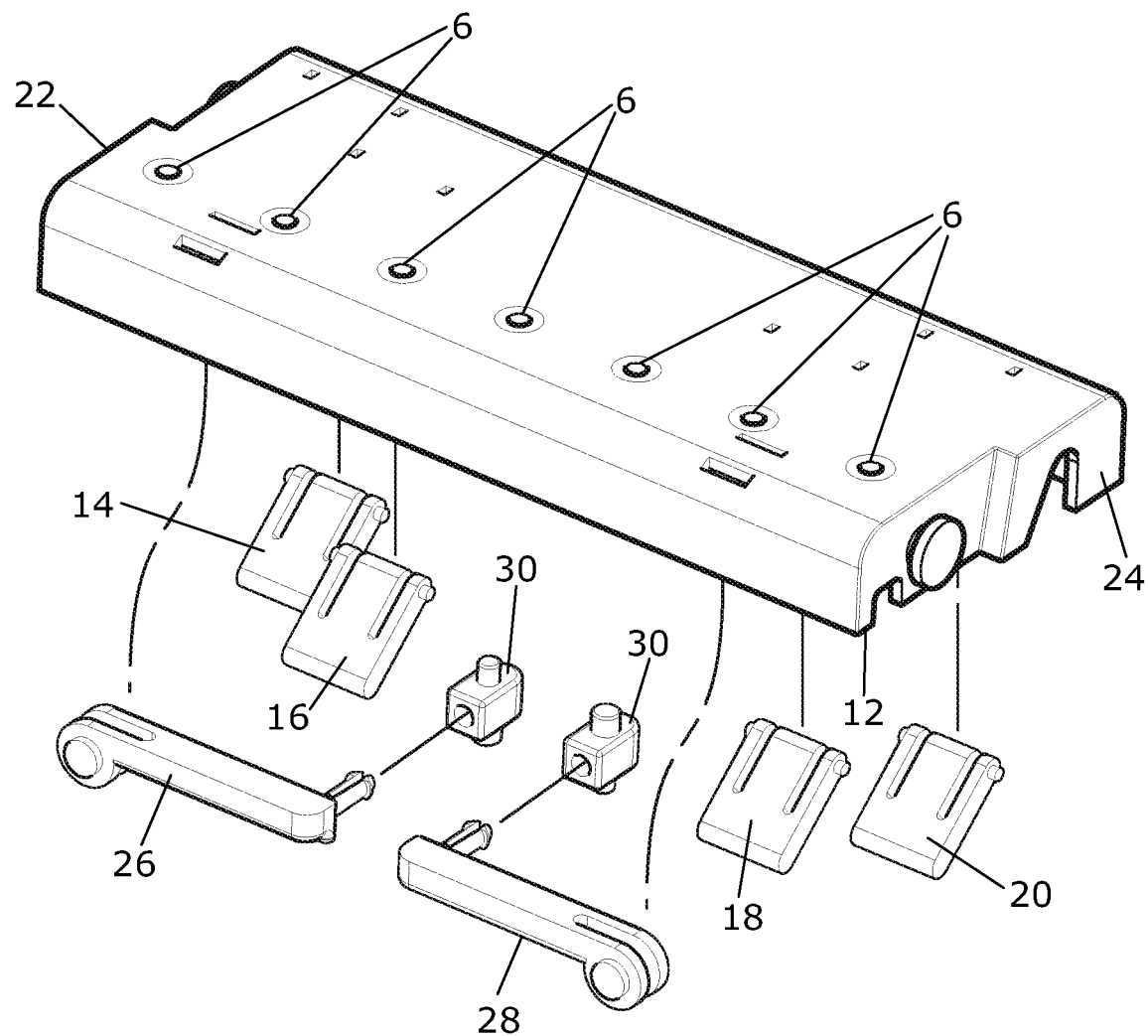
FIG. 2 illustrates the body of FIGS. 1*a*-*j* with components removed therefrom.

Referring firstly to FIGS. 1*a*-*j* and 2 there is illustrated a first embodiment of a hole drilling jig apparatus 2 which includes a body portion 4 with a series of passages 6 provided at spaced locations along an axis 7. Each of the passages pass through the body and in one embodiment receive, and are defined by, tubular steel drill guides which may be integrated with and fixed in the body 4. The body can typically be formed from a moulded plastic or is cast from a metal or metal alloy with the selected number of passages 6, (typically five to seven equally spaced passages) provided at selected spaced intervals (in one example 32 mm intervals). Each of the passages can receive a drill guide and, in turn, can selectively receive and guide a rotating drill bit as it is placed by the user into and through the passages to pass into a workpiece 10 contacting with the underside 12 of the body 4 to form a blind drill hole therein and with the process repeated for each of the passages as desired by the user to form a plurality of holes without the need to move the body with respect to the workpiece as will be described.

The spacing of the passages 6 is typically selected as the distance between centres and in addition the distance of the passages, and hence the holes which are formed, from the edge of the workpiece 10 can be selectively set (such as to 30 mm or 50 mm) by the selective use of guide means in the form, in this embodiment of non-removable, selectable guide stops 14, 16, 18, 20 provided on the body.

The four guide stops 14-20 are snapped into the underside 12 of the body near each end 22, 24. Two of the guide stops 16, 18 are closer to the passages centres than the other two. The guide stops can be folded away into the underside 12 of the body 4 or be folded out and retained in that position to create the guide edge stop by bringing the same into engagement with the edge of the workpiece. Thus, for the larger spacing, of the passages from the edge of the workpiece the edge stops 14,20 are extended as illustrated in FIGS. 1e-h and for the lesser spacing of the passages from the edge of the workpiece the edge stops 16, 18 are extended as illustrated in FIGS. 1a-d, such that when the edge stops are located on the edge of the workpiece into which the holes are drilled the passage hole centres are either 30 mm or 50 mm from the edge of the work-piece, depending on which pair of edge stops are extended at that time. If none of the edge stops are extended, as illustrated in FIGS. 1i-j, the body can be placed at any distance from the workpiece edge, or at the back of a carcass in which the workpiece is provided. The respective edge stop pairs may be identified by markings or different colours.

In order to ensure that a continuous line of shelf holes are formed by the jig apparatus 2 as the body 4 is sequentially moved along the workpiece edge, fold-out indexing arms 26, 28 are provided at respective ends 22, 24 of the body and these have a portion 30 which is formed so as to locate in the adjacent end hole of a sequence of holes formed in the workpiece during the previous location of the jig body 4 and so maintain equal spacing between the previous series and the next series to be formed when the jig body 4 is in its current location.

Figure 3A:
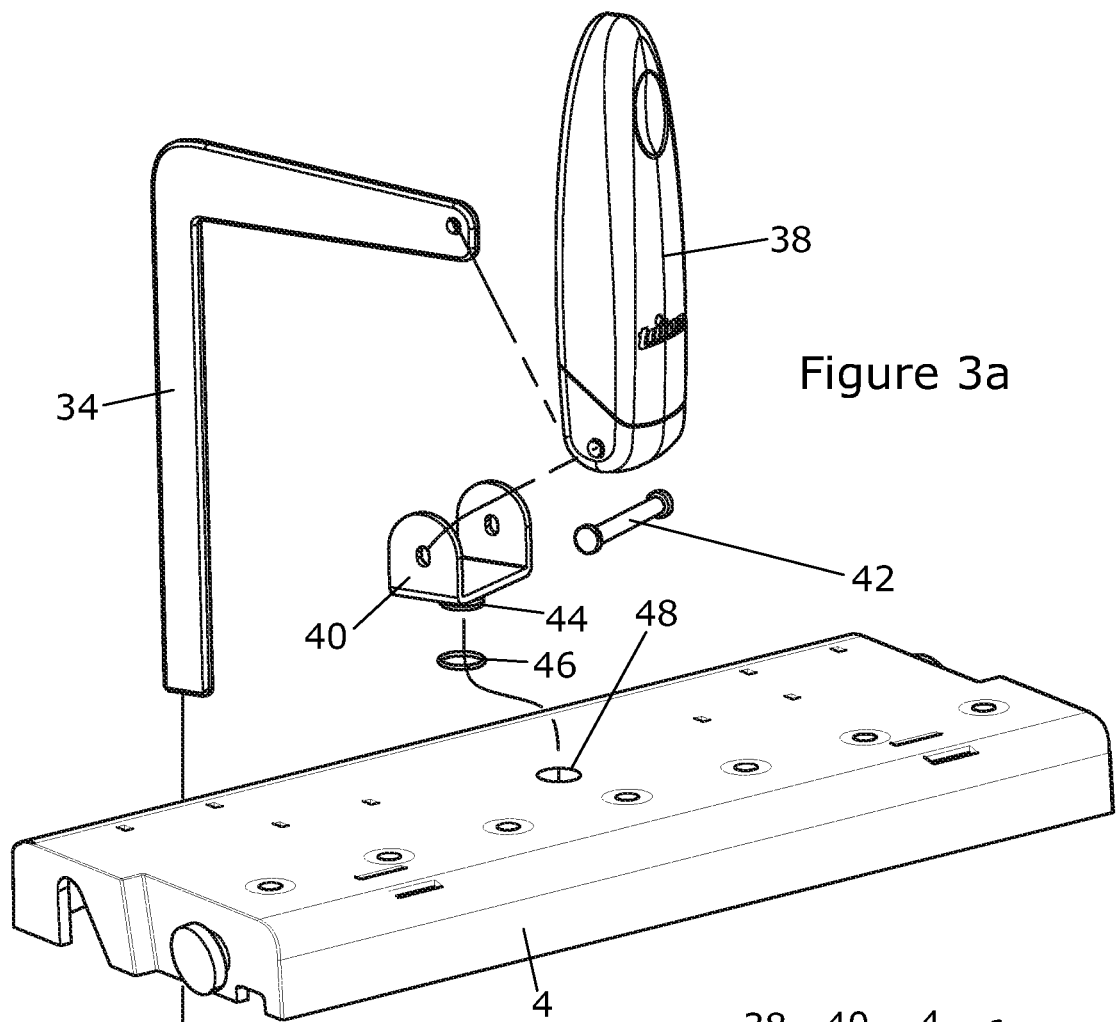
FIGS. 3*a*-*b* illustrate the body of FIGS. 1*a*-2 with clamping means provided therewith.
Figure 3B:
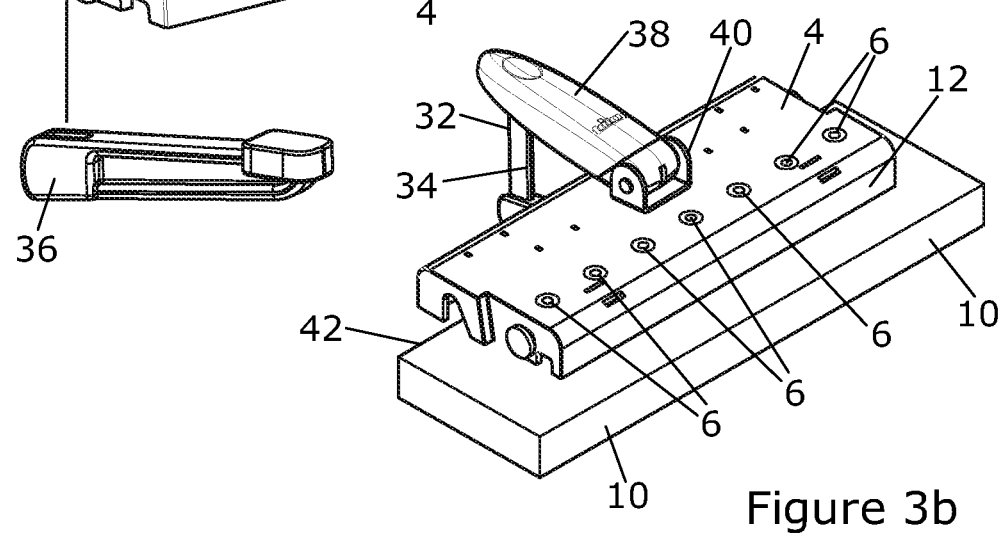
Figure 4A:
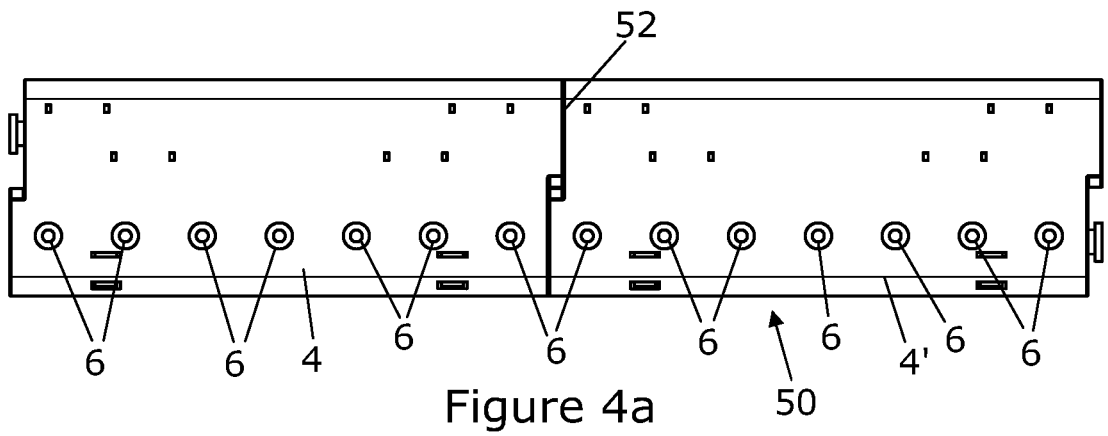
FIGS. 4*a*-*d* illustrate two of the body portions of FIGS. 1*a*-3*b* joined together to form an extended body.
Figure 4B:
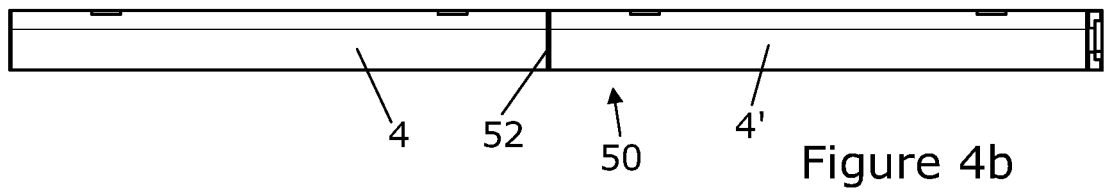
Figure 4C:
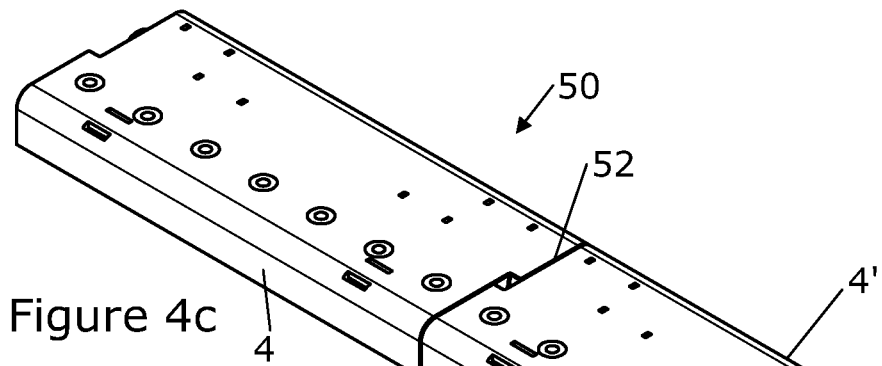
Figure 4D:
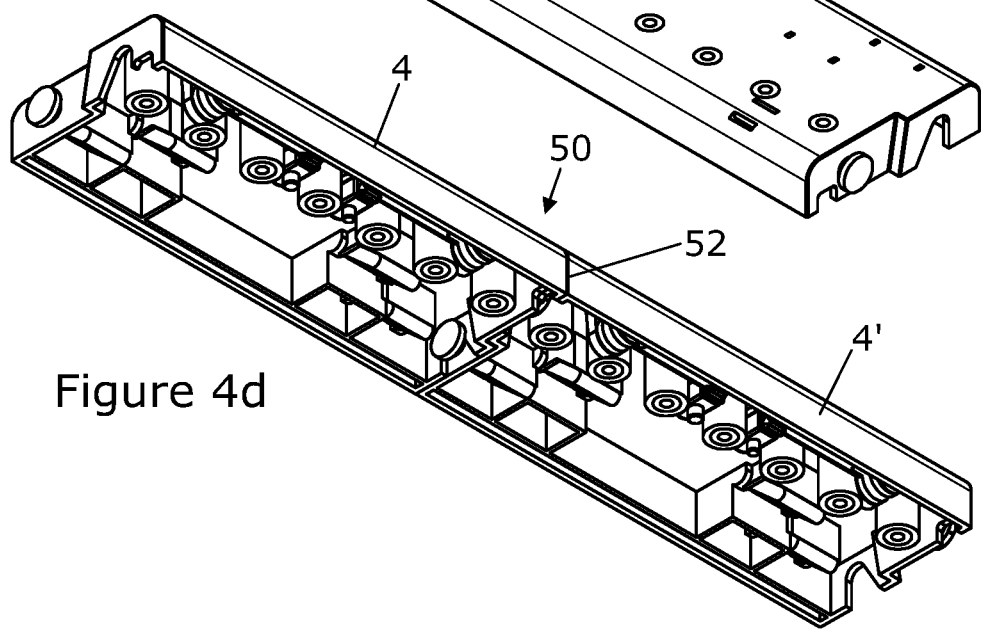

Turning now to the clamping means 32, in the embodiment shown in FIGS. 3a and b there is provided an 'L' shaped clamp spine plate 34 which forms the back-bone of the friction clamp which has a skew-locking lower jaw arm 36 at a first end and a cam lever 38 and cam yoke 40 at the opposing end. The cam lever and cam yoke are mounted to the upper clamp spine plate via a lever pin 42. The cam lever 38 has eccentric bearing surfaces and acts vertically on the cam yoke 40 which clamps the body 4 and work-piece 10 together as indicated in FIG. 3b by virtue of its slotted lever pin holes and, if used, the appropriate edge stops engage with the edge 42 of the workpiece to space the passages 6 from the edge 42 to the appropriate amount.

The acting eccentric cam feature on the cam lever 38 that acts on the cam yoke 40 may be provided as any of an engineering plastic nib, small rollers or roller bearings to reduce frictional drag when performing the clamping operation. The cam yoke 40 removably connects to the body 4 via a boss 44 and snap ring 46 in an aperture 48 in the body 4, allowing the body to be releasable connected to the cam yoke and/or to be rotated out of alignment with the clamp. The clamping means 32 may also be used for other purposes separate to the body such as joint alignment.

In one embodiment the body 4 can be selectively positioned on the workpiece 10 to form holes at the spaced intervals in the workpiece, and once the holes are formed, the body 4 can be selectively moved to another location on the workpiece 10 to form another set of holes therein and so on until all of the required holes have been formed. As an alternative to the selective placing of the body, a series of the bodies 4,4' can be joined end to end to form a combined body assembly 50 of greater length, as illustrated in FIGS. 4a-d and thereby allow a longer row of holes via the passages 6 to be formed without the need to move the combined body 50 with respect to the workpiece 10 which leads to a greater accuracy in the formation the series of holes and increased speed of forming the same. The bodies 4, 4' are joined at the interface 52 via engagement means which will be described in more detail subsequently.

Figure 6:
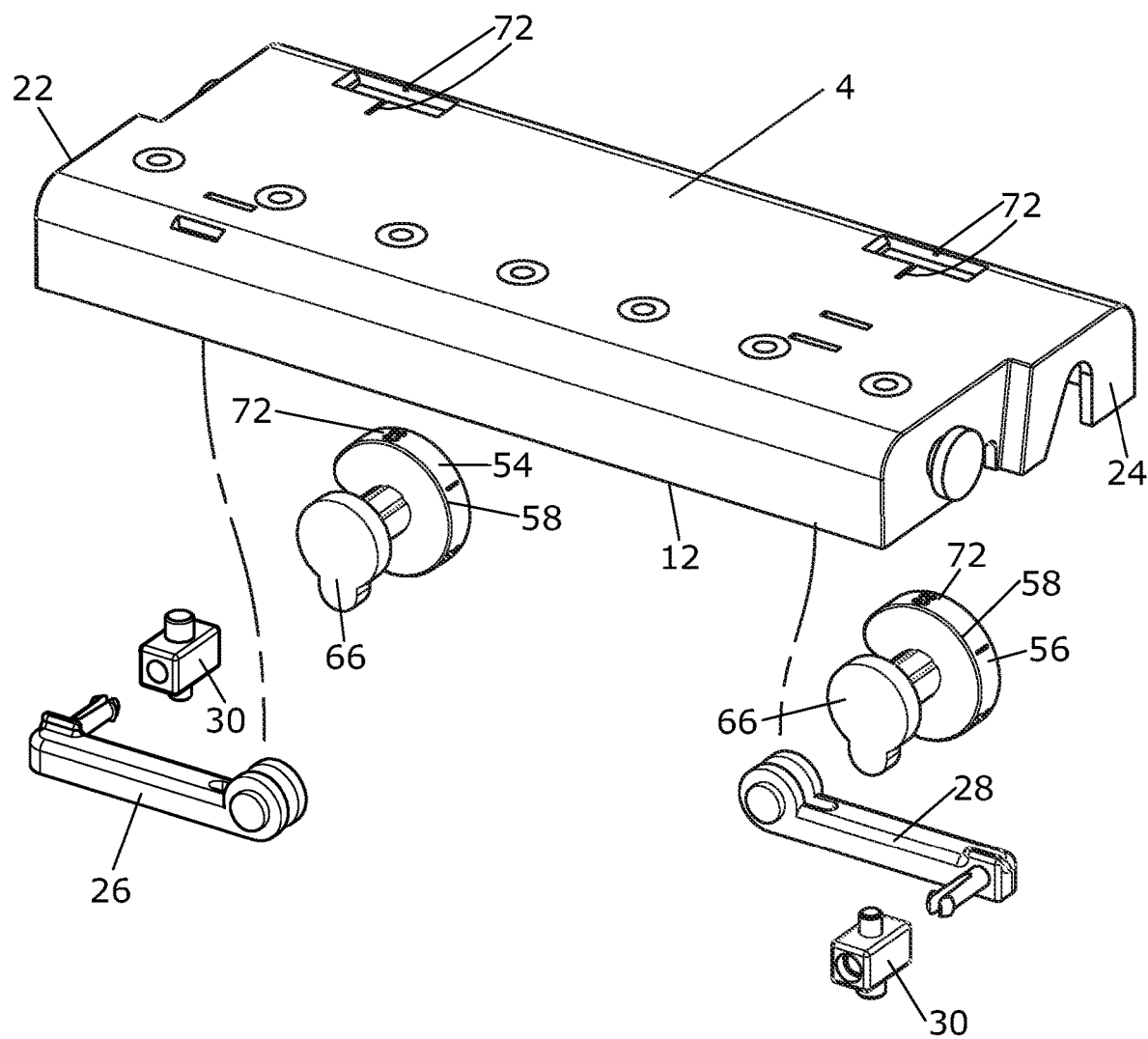
FIG. 6 illustrates the body of FIGS. 5*a*-*h* with components removed therefrom.
Figures 7A, 7B:
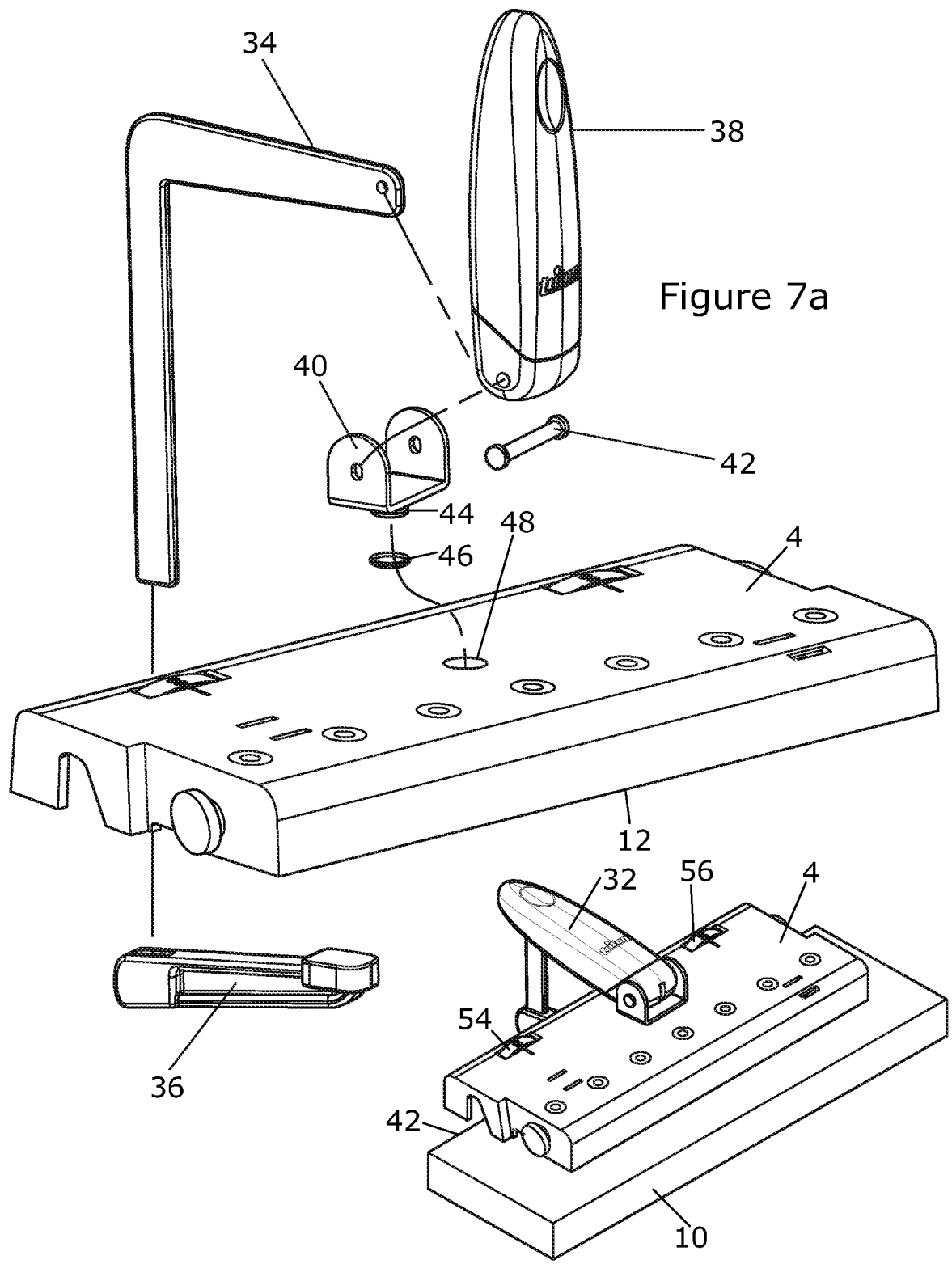
FIGS. 7*a*-*b* illustrate the body of FIGS. 5*a*-6 with the clamping means provided therewith.
Figure 10A:
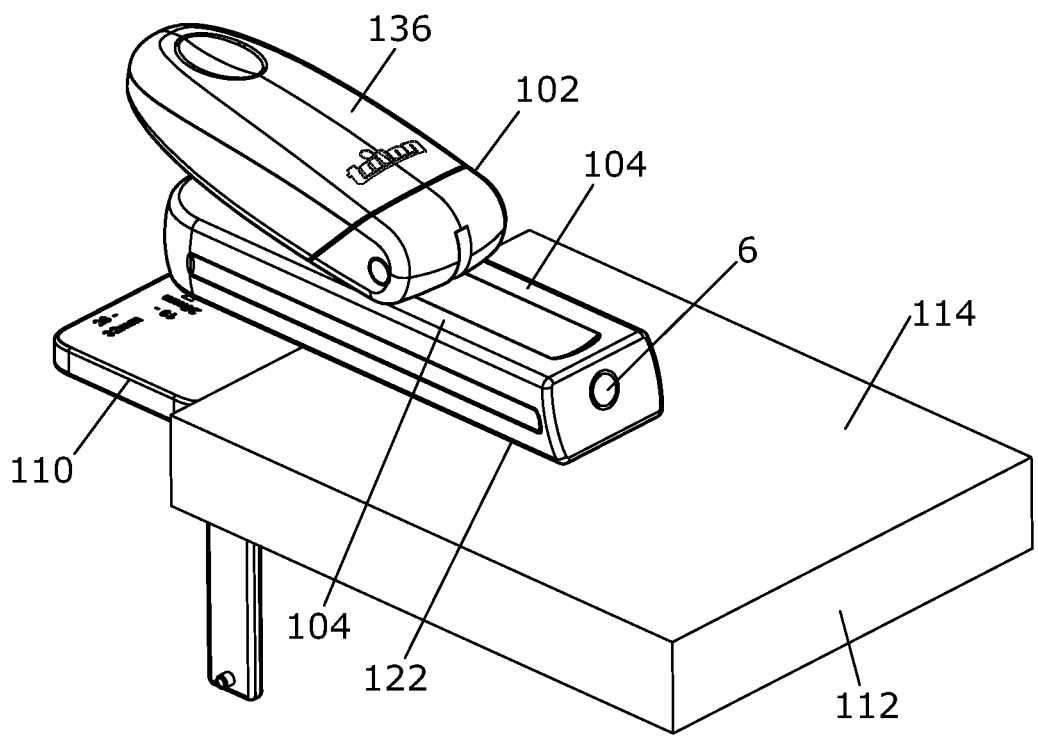
FIGS. 10*a*-*b* illustrate first and second views of a further embodiment of a jig apparatus in accordance with the invention in a clamped position.
Figure 10B:
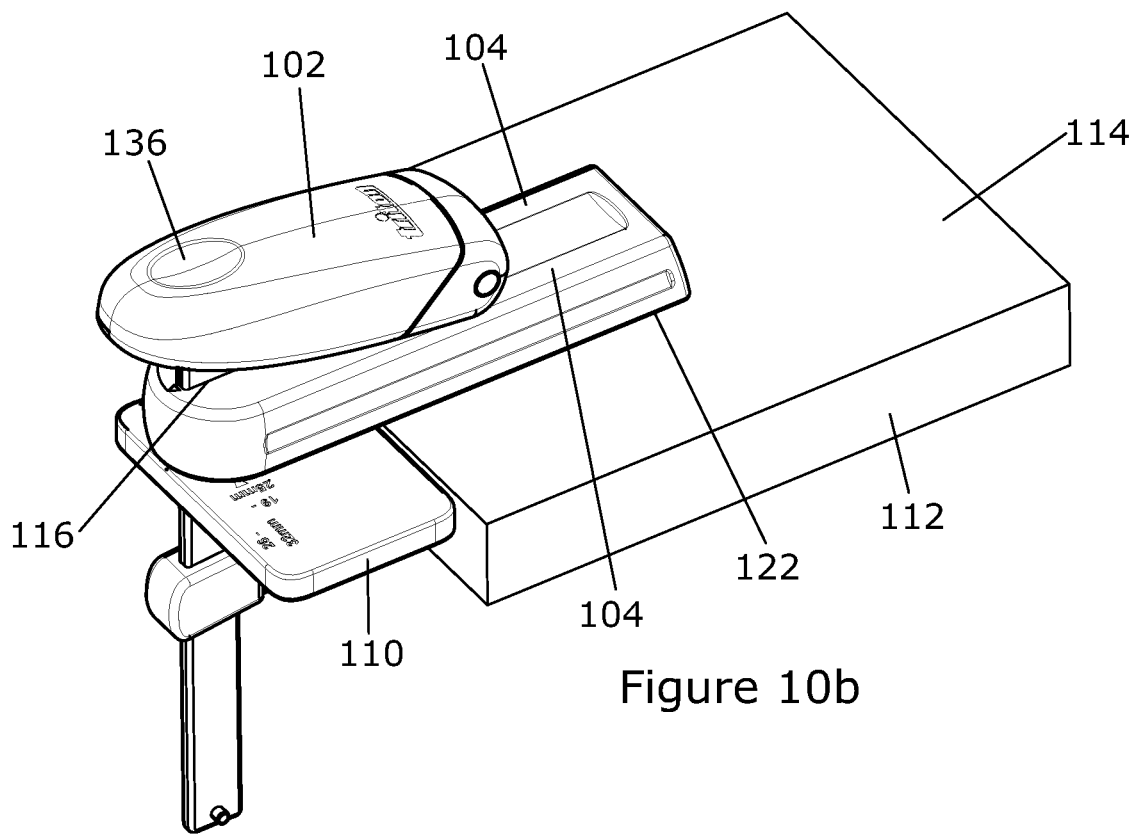
Figure 11A:
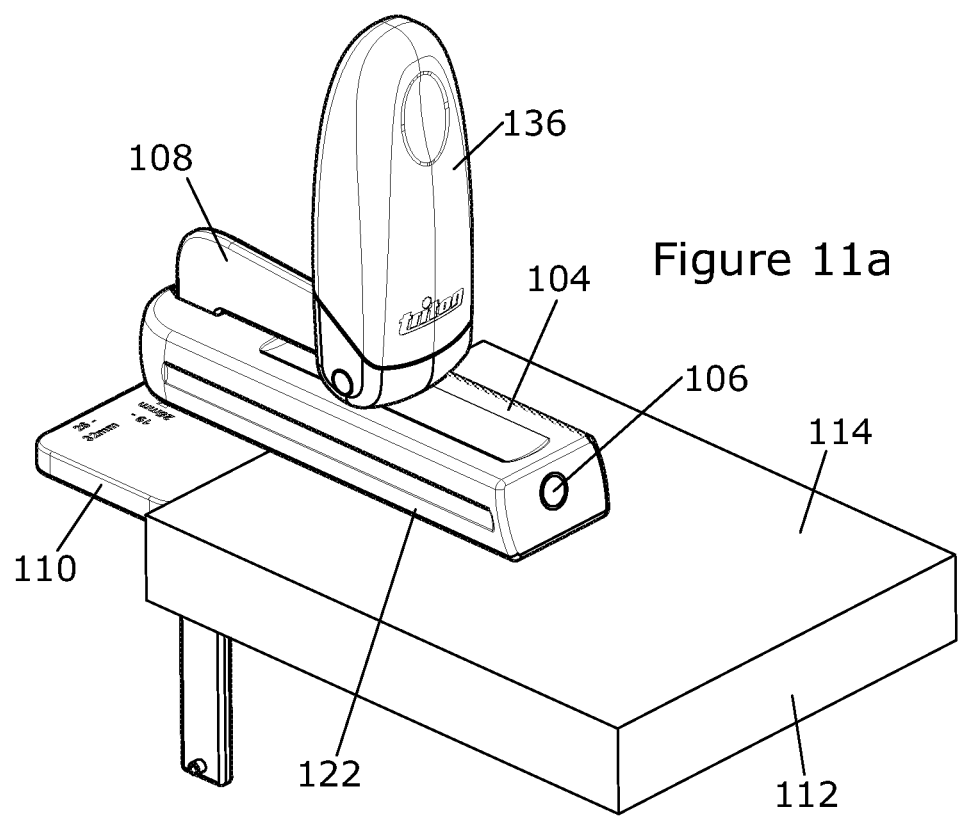
Figure 11B:
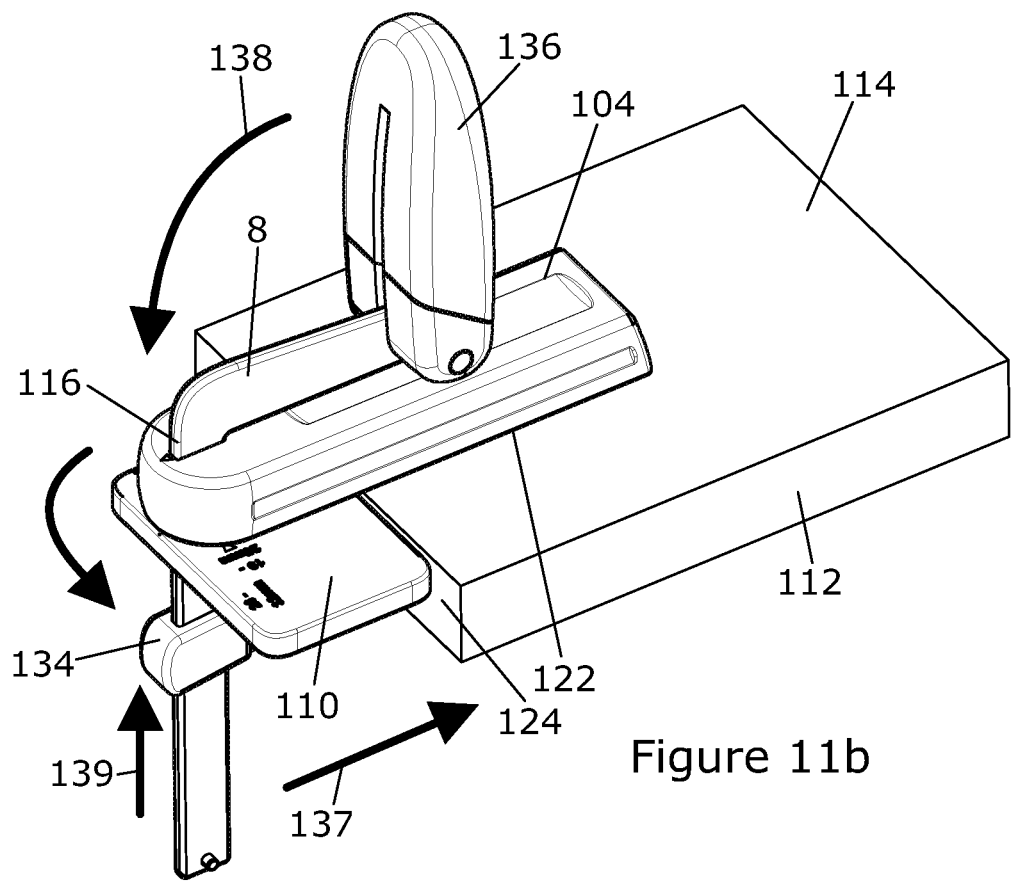

Referring now to the FIGS. 5a-6 there is illustrated a second embodiment of the invention. The features which are common to both embodiments are provided with the same reference numbers and the clamping means 32 used in this embodiment operates in the same manner as described with respect to the first embodiment and as illustrated in FIGS. 7a-b. However in this second embodiment of the invention there is provided the ability to adjust the distance of the passages 6 in the body from the edge 42 of the work-piece by the use of wheel adjusters 54, 56. The adjusters are typically identical and are provided to be engaged in apertures in the body 4 such that a portion 58 of each protrudes above the body top surface 60 so as to be accessible and rotatable by a person, such as by using their thumb to rotate the same as indicated by arrows 62. This causes the rotation of the portion 66 of the wheel adjuster as indicated by arrows 64. When the user selectively rotates the wheel adjuster in one direction this acts to lower a part 68 of the portion 66 below the body 4 at a predetermined distance from the passages 6 centres as indicated in FIGS. 8a-d. If the user rotates the wheel adjusters in the opposite direction, this acts to lower a different part 70 of the portion 66 below the body 4 at a different predetermined distance from the passages 6 centres as indicated in FIGS. 8e-h. A third setting of the thumb wheel adjusters withdraws results in none of the portion 66 depending below the lower surface 12 of the body as indicated in FIGS. 8i-j, so that the body 4 can be placed and clamped at any distance from the workpiece edge 42, or at the back of a carcass. Typically the different adjustment positions are identified graphically 72 on the wheel adjusters 54, 56 and/or body 4. Once again, to allow the placement of a continuous line of shelf holes, fold-out indexing pins 26, 28 are provided and one of the pins, 28, is shown in an extended position in FIGS. 5a-h so as to locate in the end hole of previously formed holes in the workpiece 10 to maintain equal spacing between each sequence of holes which are formed.

For longer hole sequences, two or more bodies 4, 4' can be joined together by using the engagement means 74,76 on adjacent ends 22, 24' of bodies 4,4' as indicated in FIGS. 9a-c. In FIG. 9a it is shown how the male engagement means 78 on the respective ends 22, 24' are received in respective female slots 80 and then a twist action along longitudinal axis 82 between the respective bodies 4,4' locks the engagement means together to form the interface 52 and bring the bodies 4, 4' in line to form the body assembly 50 as indicated in FIGS. 9c.

Once the holes have been formed, then, if the workpiece is a shelving bracket or part of an item of furniture to receive shelves, the support pins or other means can be selectively inserted into a series of holes in different brackets or workpieces at the same height and protruding portions then receive the shelf thereon and act to support the shelf at the required height. Thus, the speed of producing the series of said holes in the workpieces is improved and the accuracy of the same is also improved.

It should also be noted that although the description of the use of these workpieces relates to the provision of shelving, there are other uses where the provision of an accurate series of holes can be of benefit and therefore the description of use with shelving should not be interpreted as a limitation of the scope of the invention.

Figure 12:
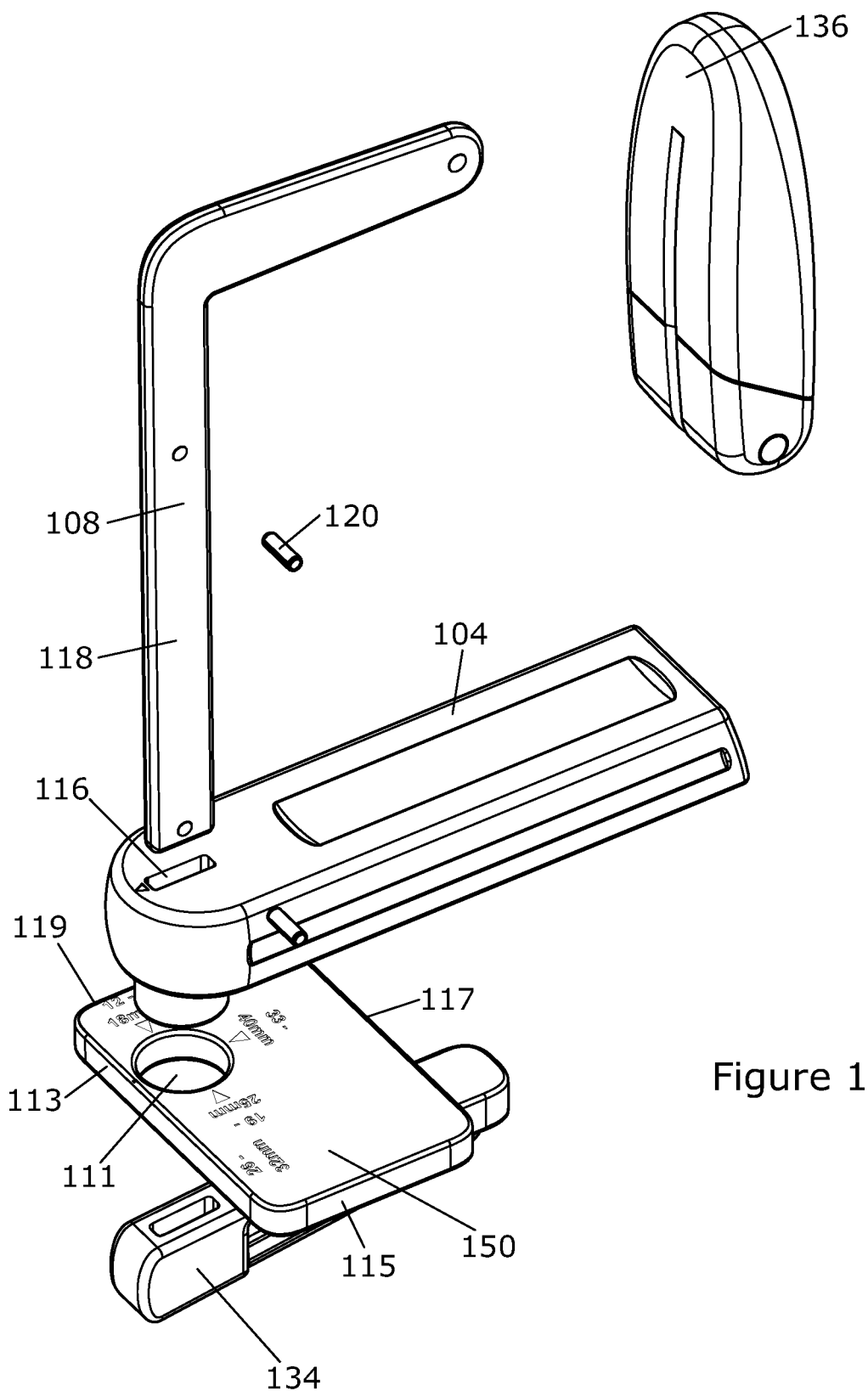
FIG. 12 illustrates an exploded diagram showing the components of the jig apparatus in accordance with said embodiment of FIGS. 10*a*-11*f*.
Figure 15A:
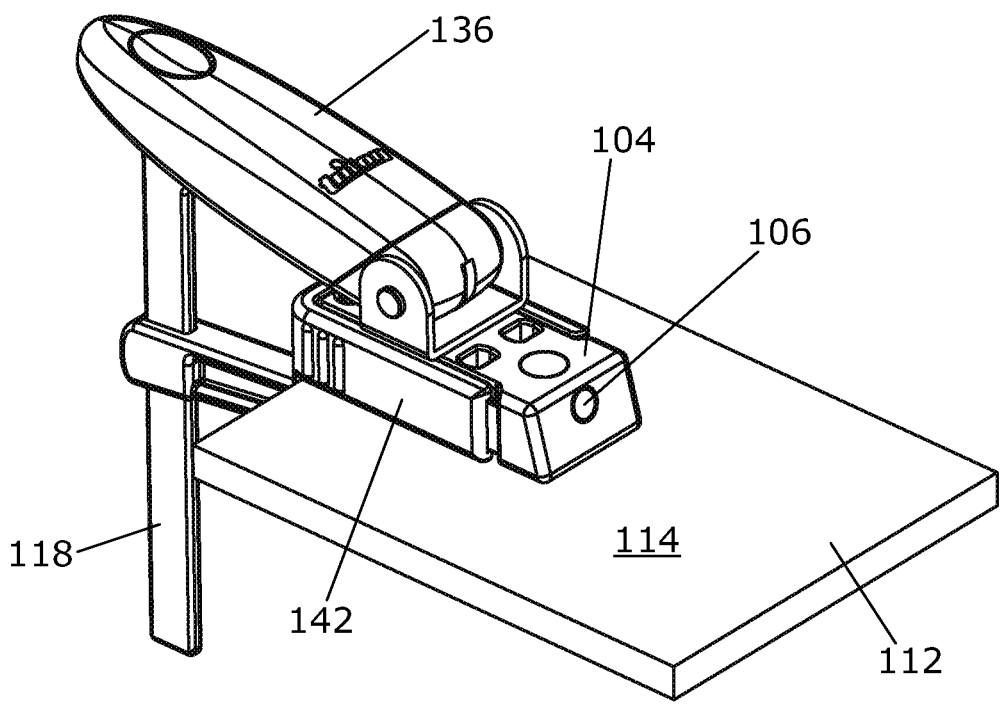
FIGS. 15*a*-*b* illustrate first and second views of a further embodiment of a jig apparatus in accordance with the invention in a clamped position.
Figure 15B:
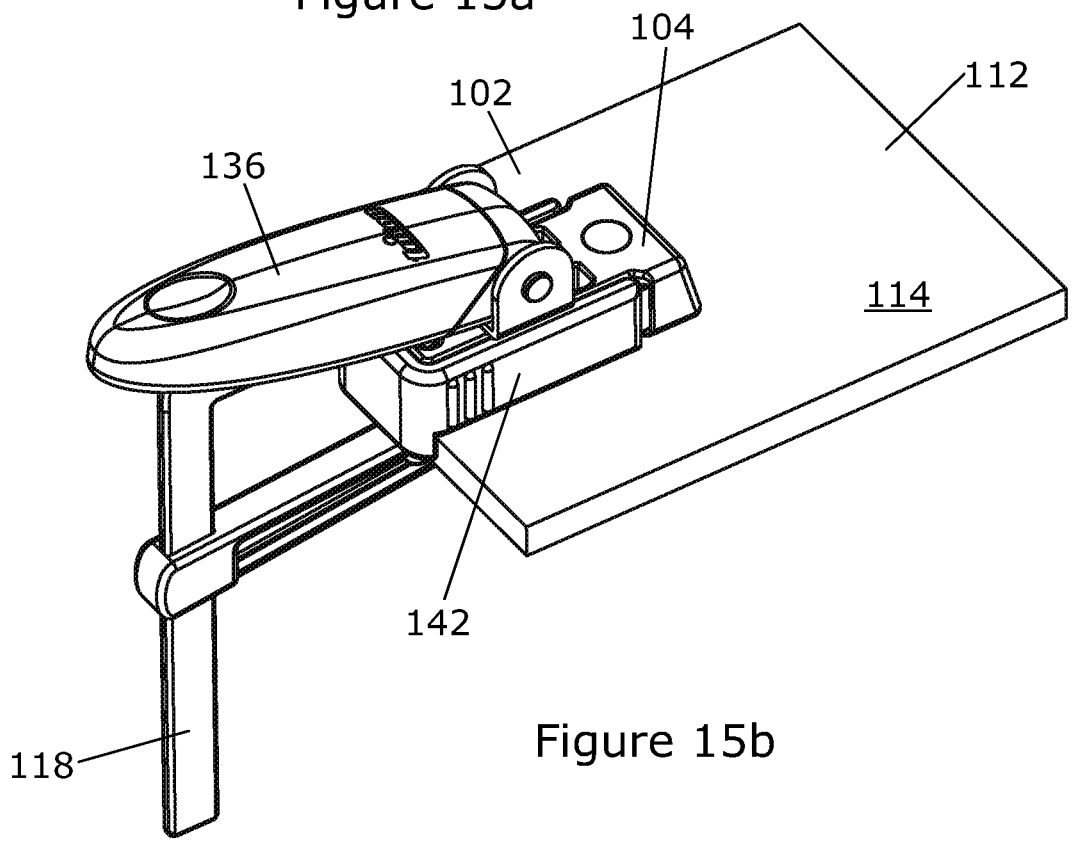
Figure 16A:
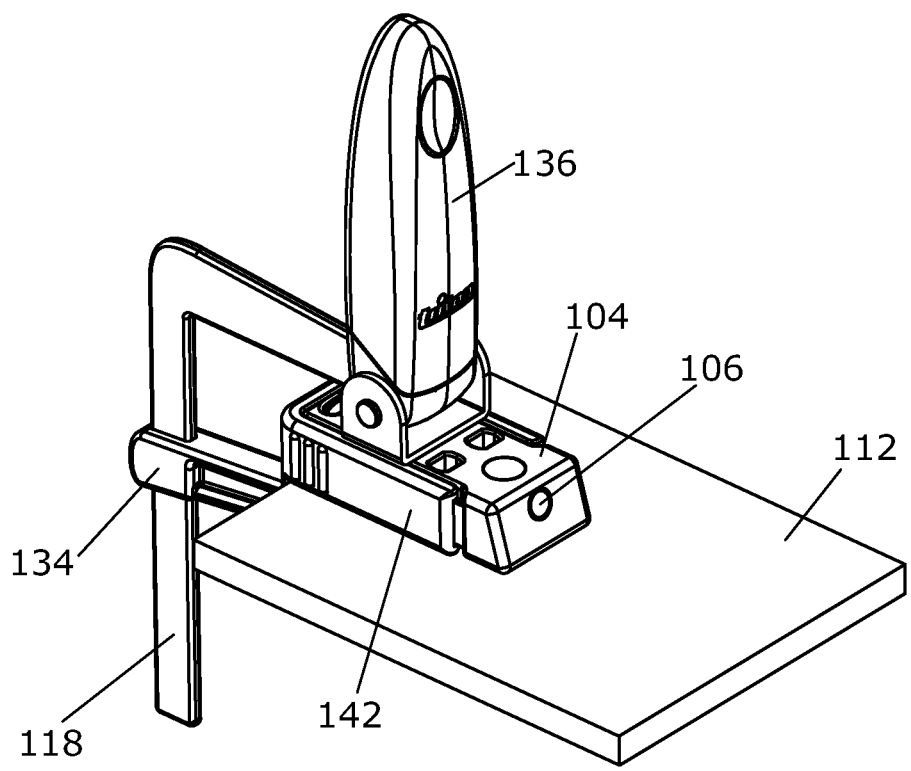
Figure 16B:
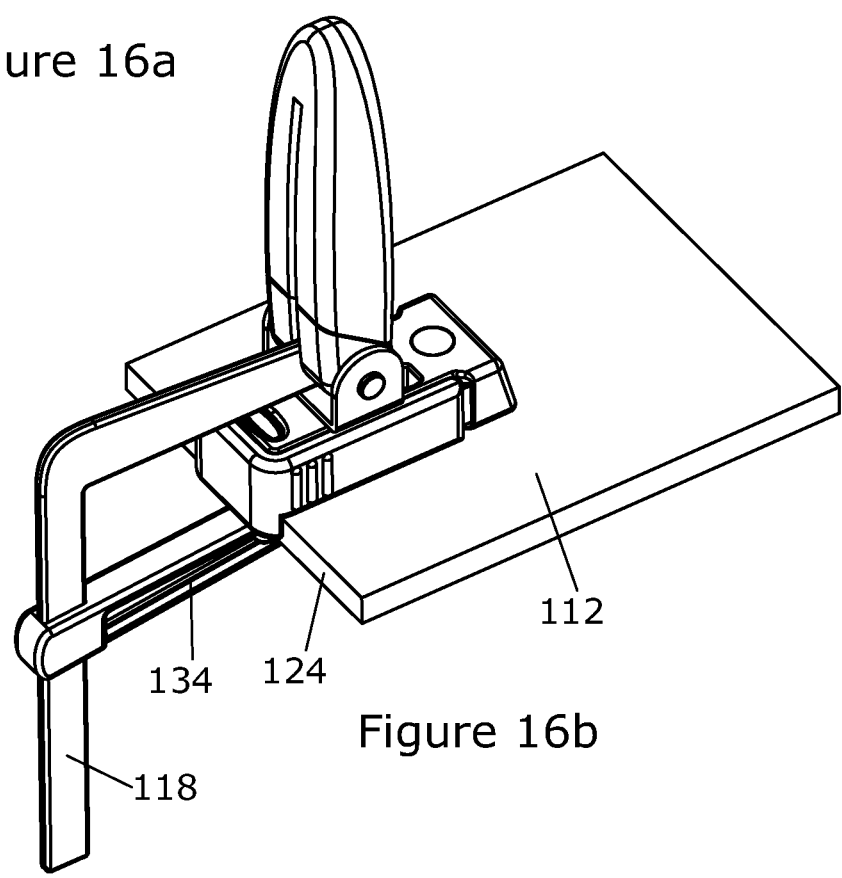
Figure 18:
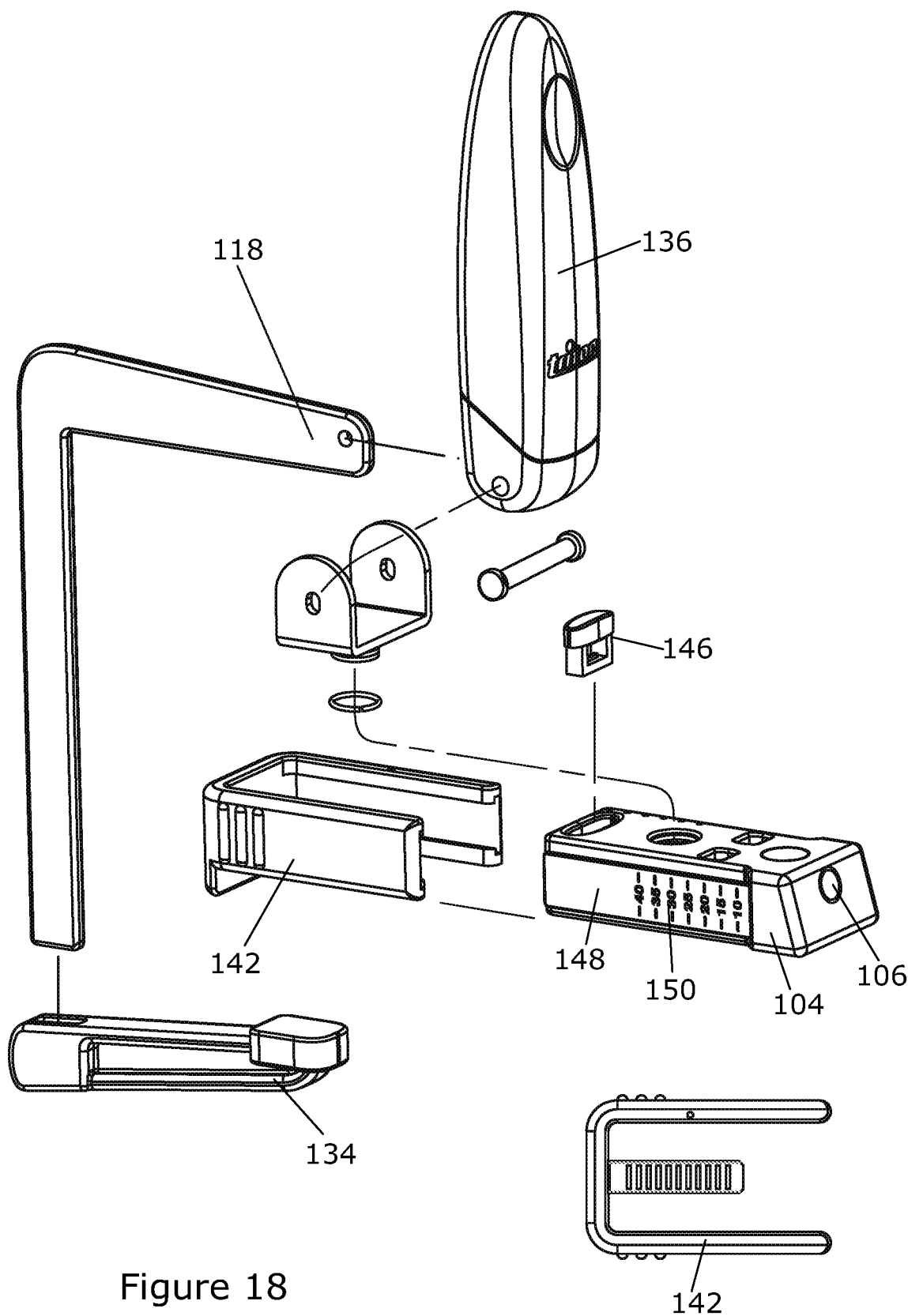
FIG. 18 illustrates an exploded diagram showing the components of the jig apparatus in accordance with the FIGS. 16*a*-17*c*.

Referring now to FIGS. 10a-14e there is illustrated a further embodiment of a jig apparatus which is provided to allow the formation of drill holes known as pocket holes. The apparatus 102 in this embodiment includes a body 104 in which there is located one or more passage 105 with an integrated tubular steel drill guide 106 and a friction clamp 108. The body also includes an assembly with an adjustable gauge plate 110 which, in this embodiment, has an aperture 111 and four predefined sides 113, 115, 117, 119, as shown in FIG. 12, and to which are allocated, respectively, different sizes of workpiece depths, such as 112-118, 119-125, 126-133, 134-140. The user can select which side of the guide plate to use for a particular drilling operation depending upon the known thickness of the workpiece 112 with which the jig is used at a particular time. This ensures that the pocket drill hole is drilled at the correct position and also depth for the known workpiece thickness.

The body 104 can be formed of moulded plastic or cast metal or metal alloy, and includes, in this embodiment, two inclined hard steel sleeves which form the guides 106 for a step drill bit to be moved into the workpiece at an angle, typically, in the range of 12-20° to the face 114 of the workpiece. At the other end of the body 104 there is provided an aperture 116 through which an 'L' shaped clamp spine plate 118 of the friction clamp 108 is attached. The movement of the friction clamp is limited and is retained by a scroll pin 120 which passes through the spine plate 118.

On the underside 122 of the jig body 104, and centred on the vertical spine plate aperture 116, is the aperture 111 which is formed as a boss around which the rectangular shaped gauge plate 110 rotates. The four-sides 113, 115, 117, 119 of the rotatable gauge plate 110 are provided such that, in conjunction with the off centre location of the aperture 111, they lie at a different distance from the aperture 111, and the respective distances determine how far the jig 102 will be positioned from the edge 124 of the workpiece. This therefore means that the optimum depth of pocket hole for the known thickness of the workpiece is achieved by using the appropriate gauge plate side for a particular drilling operation. The user can therefore select to position the appropriate side 113, 115, 117, 119 of the gauge plate against the edge 124 of the workpiece with a known depth and in relation to which they are to use the jig at that time.

In one embodiment a catch mechanism is provided to ensure that the gauge plate 110 clicks into each of the four available side alignments and is retained in that position until a movement force is subsequently applied.

In one configuration the gauge plate 110 comprises two plate portions, the second providing three or four more increments between the first plate settings for maximum adjustability.

The friction clamp 108 consists of the rigid 'L' shaped spline plate 118 member mounted through the aperture 116 in the jig body 104, a slidable, skew-locking lower jaw 134 and a cam-lock clamping lever 136 and the clamp serves to hold the jig 102 in place with the workpiece 112 while the hole is drilled. The 'L' shaped clamp spine plate 118 forms the back-bone of the friction clamp which has a skew-locking lower jaw arm 134 at the bottom and the cam lever 136 and cam yoke at the top. The cam lever and cam yoke are mounted to the upper clamp spine plate with the lever pin. The cam lever, having eccentric bearing surfaces, acts vertically on the cam yoke which clamps the hole jig/gauge assembly onto the work-piece by virtue of its slotted lever pin holes. The acting eccentric cam feature on the cam lever that acts on the cam yoke is either an engineering plastic nib, small rollers or roller bearings to reduce frictional drag when clamping. The cam yoke removably connects to the hole jig assembly with a boss and snap ring, allowing the hole jig assembly to snap on and off the cam yoke and swivel out of alignment with the clamp.

Thus, in order to drill a pocket hole using the jig of the first embodiment the gauge plate 110 moved so that the appropriate side for the known workpiece depth is positioned such as to contact with the edge 124. The jig is then positioned onto the workpiece as illustrated by arrow 137 in FIG. 11b and the jaw 134 is slid up to contact the underside of the workpiece as illustrated by arrow 139. As illustrated in Figure lib, the lever 136 is then moved as illustrated by arrow 138 to operate the clamp 108 and so clamp the jig in position at the edge of the work-piece 112. A depth limiting collar is tightened onto the step drill shank at a prescribed distance from the drill point. The drill bit is tightened into the chuck/collet of a corded or cordless drill/driver and the drill bit is lowered into the drill guide 106 which allows movement of the drill bit as it rotates along the axis 140 and hence delivers the drill into and through the workpiece 112 at the correct angle. In one embodiment, moulded-in or printed graphics on the gauge plate indicate to the user the thickness selection for the respective sides of the gauge.

Referring now to FIGS. 15a-20c the same components as in the embodiment shown in FIGS. 10a-14e are provided with the same reference numerals. However, in this embodiment, rather than provide a rotatable gauge plate there is provided a reversible sliding gauge plate 142 which ensures that the pocket hole is drilled in the correct position and at the right depth for a given workpiece with the which the jig is to be used at that time.

At the end of the body 104 opposing the opening into the drill passage 106 the sliding jig gauge 142 is slidingly movable with respect to the body as indicated by arrow 144 and this movement and positioning determines how far the hole formed using the jig will be off-set from the edge of the work-piece when the gauge is contacted with the edge of the workpiece. The sliding jig gauge 142 is moved along rails 148 on the drill guide with a sprung release button 146 which allows it to slide between stepped increments to the desired position, with the movement guided by an integrated numerical scale 150.

FIGS. 19a-c and 20a-c illustrate the manner in which the gauge plate 142 can be provided in two configurations, a first configuration shown in FIGS. 19a-c in which the lip 152 is raised and provided flush with the workpiece edge 124 for use with an internal corner joint formation, and a second embodiment in which the lip portion 152 extends along and in front of the edge 124 of the workpiece 112 for an external corner set up.

In one embodiment the clamp 115 is separable and can be used for joint alignment or elsewhere.

Figure 21A:
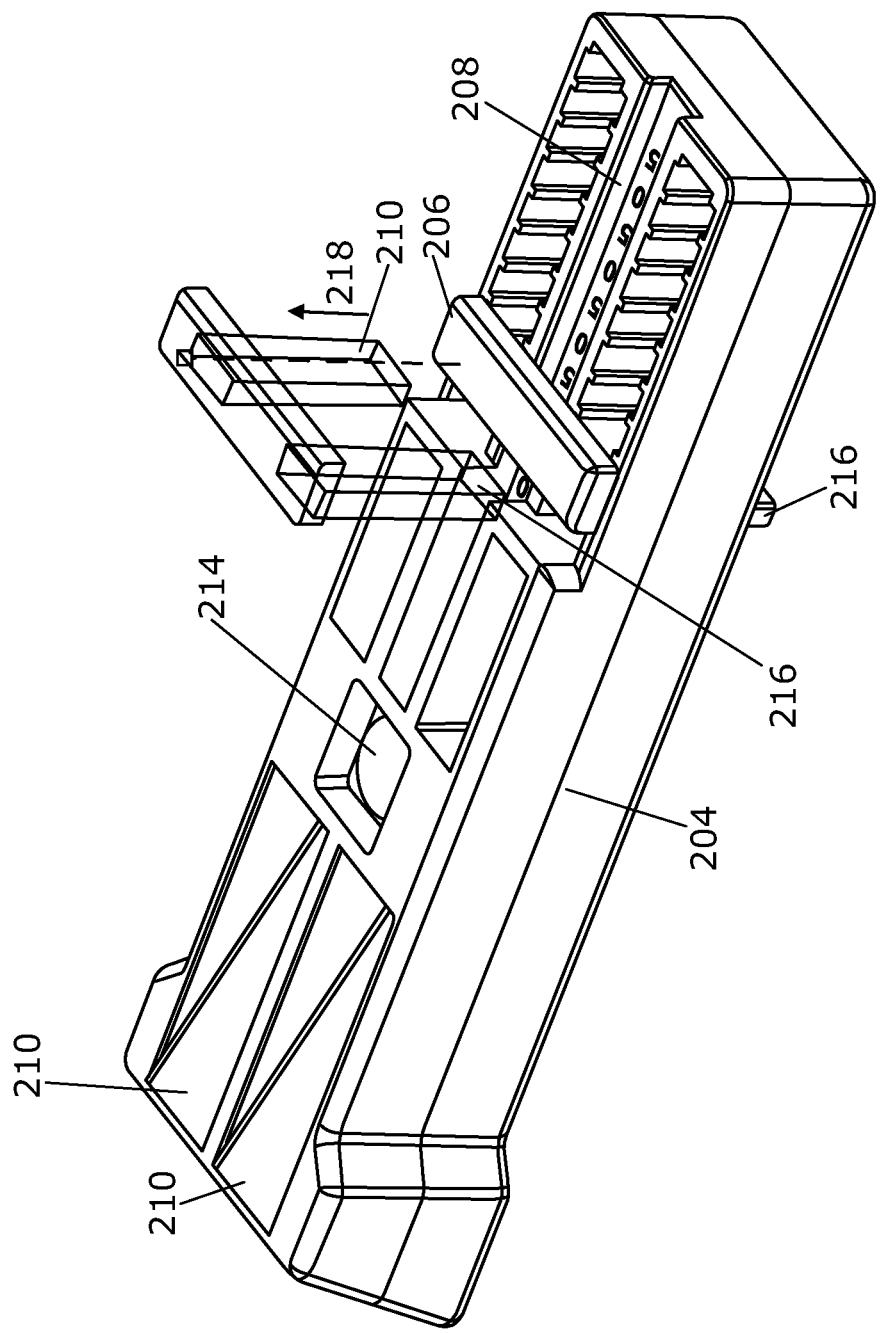
FIGS. 21*a*-*f* illustrate a further embodiment of a jig apparatus in accordance with the invention.
Figure 21B:
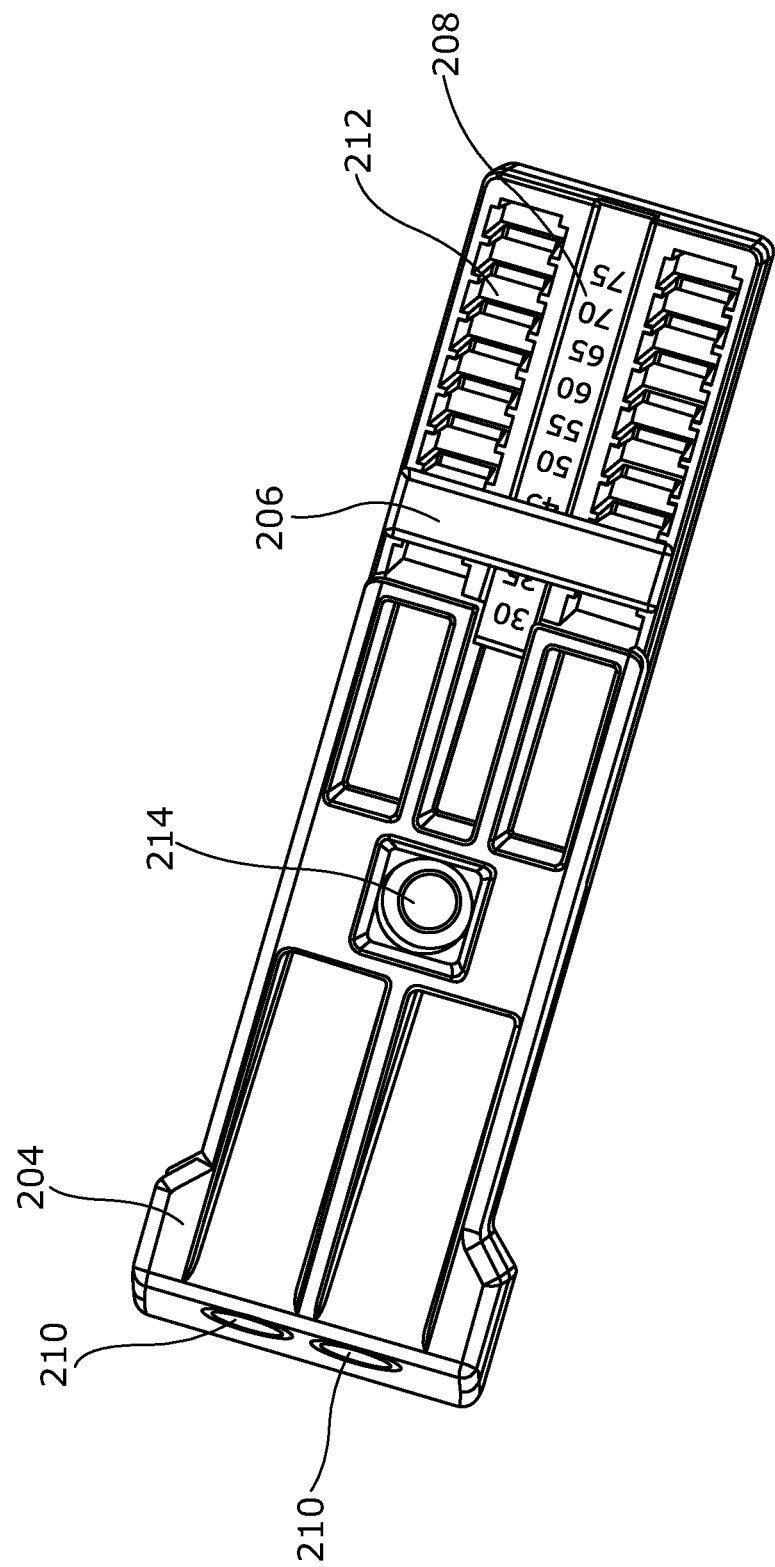

Referring now to FIGS. 21a-f there is illustrated a further embodiment of jig apparatus for use to provide a guided drilling operation by a driven rotating drill when used in conjunction with the jig apparatus. The jig apparatus includes a body 204 and, in this embodiment two channels 210 along which a drillbit can be selectively introduced and moved therealong and into the workpiece to drill a hole therein. The jig apparatus includes a guide means which includes a part 206 which is selectively movable with respect to the body 204 by the user. The guide means part 206 is provided with leg portions 216 which protrude from the underside of the body 204 as illustrated in FIG. 21a so that the body is moved so that the portions 216 engage with a side wall of the workpiece into which the hole is to be drilled and so the guide means allows the position of the body 204 with respect to the workpiece to be selected.

In one embodiment the guide means part 206 is selectively positionable in any one of a range of receiving means ports 212 which, along with a scale 208, are formed on the body 204. Typically there are provided a series of the ports 212 in the body provided along the longitudinal axis of the body as shown. The user can then selectively position the part 206 with respect to one set of ports such that the leg portions 216 pass through respective ports 212, 212' located along an axis substantially perpendicular to said longitudinal axis.

Figure 21C:
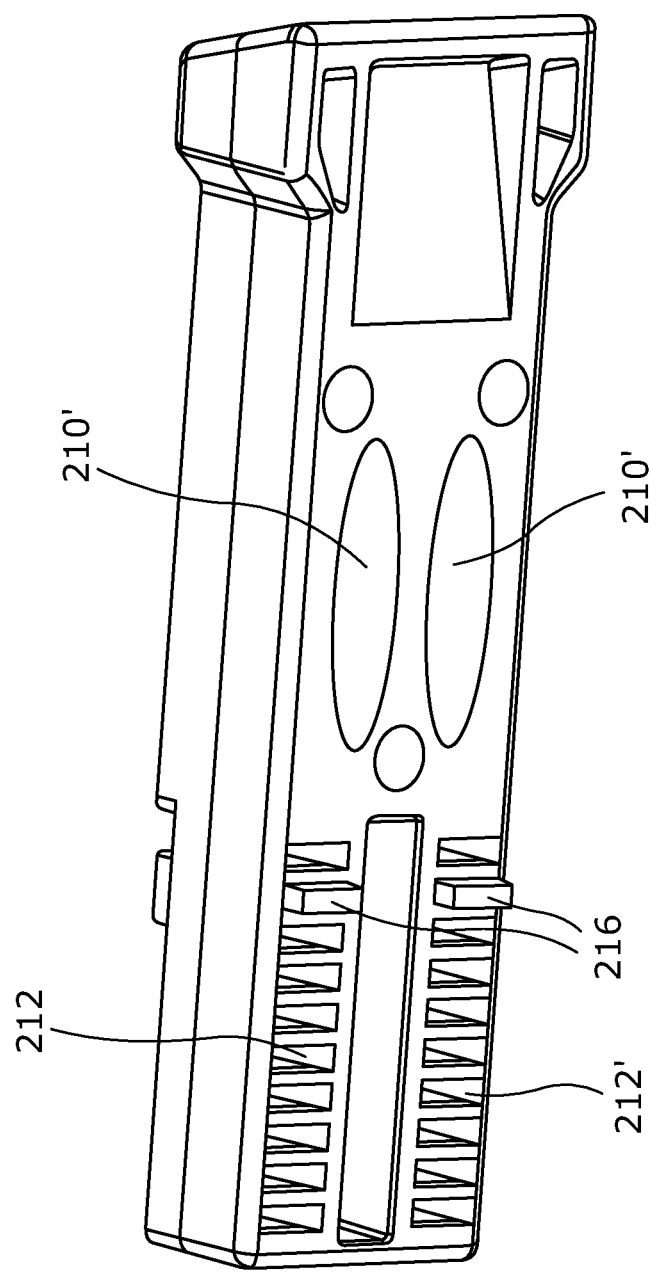
Figure 21D:
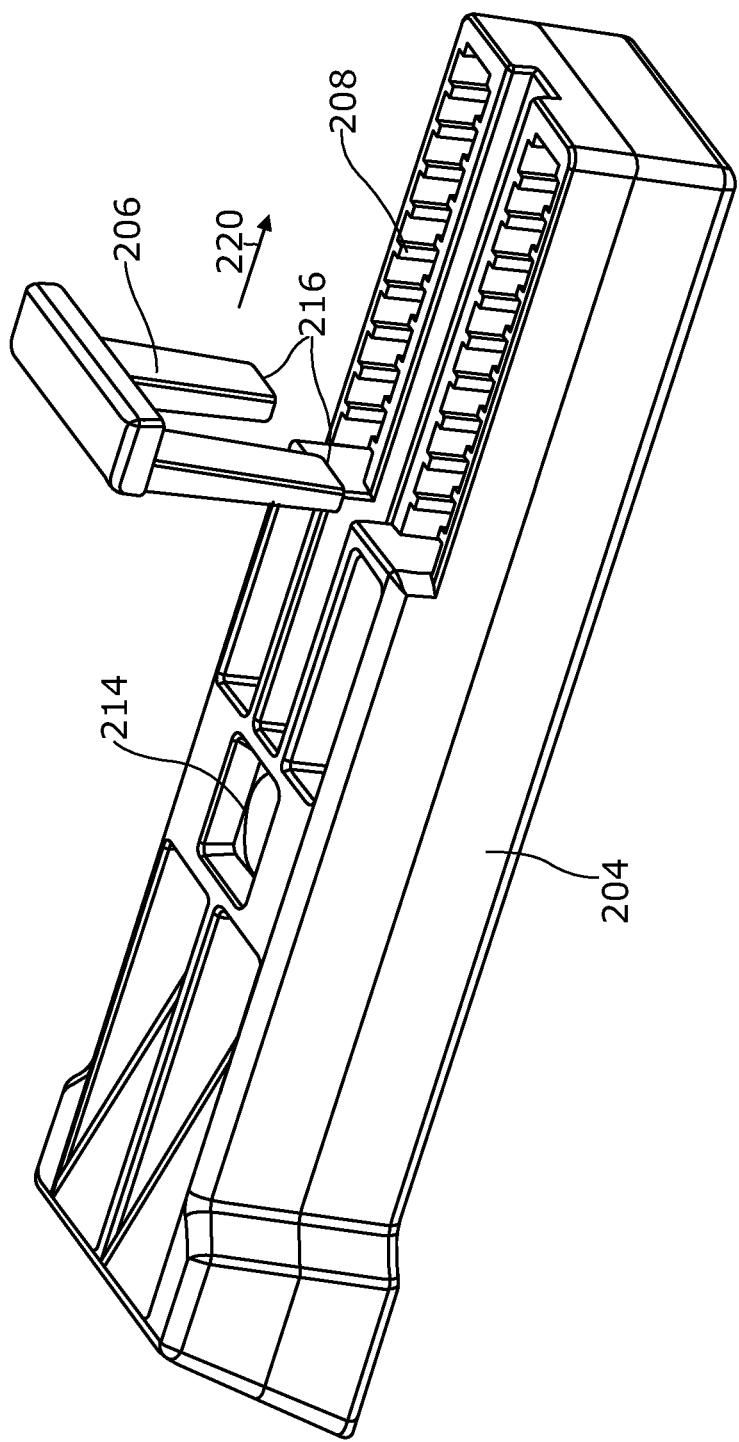

In one embodiment the free ends of said leg portions 216 protrude from the said ports 212, 212' to form the portions against which the edge of the workpiece is contacted when the underside of the body 204 is positioned on the surface of the workpiece so as to provide the workpiece at the desired location with respect to the jig apparatus and the drill bit can then be placed along the passage 210 when driven to move out of the passages at the exist 210' on the underside of the body 204 as shown in FIG. 21c and then pass into the workpiece to form the hole therein. The body 204 also includes attachment means 214 which allow for the location and engagement of clamping means, similar to those already described which can be used to clamp the body 204 in position on the workpiece.

Figure 21E:
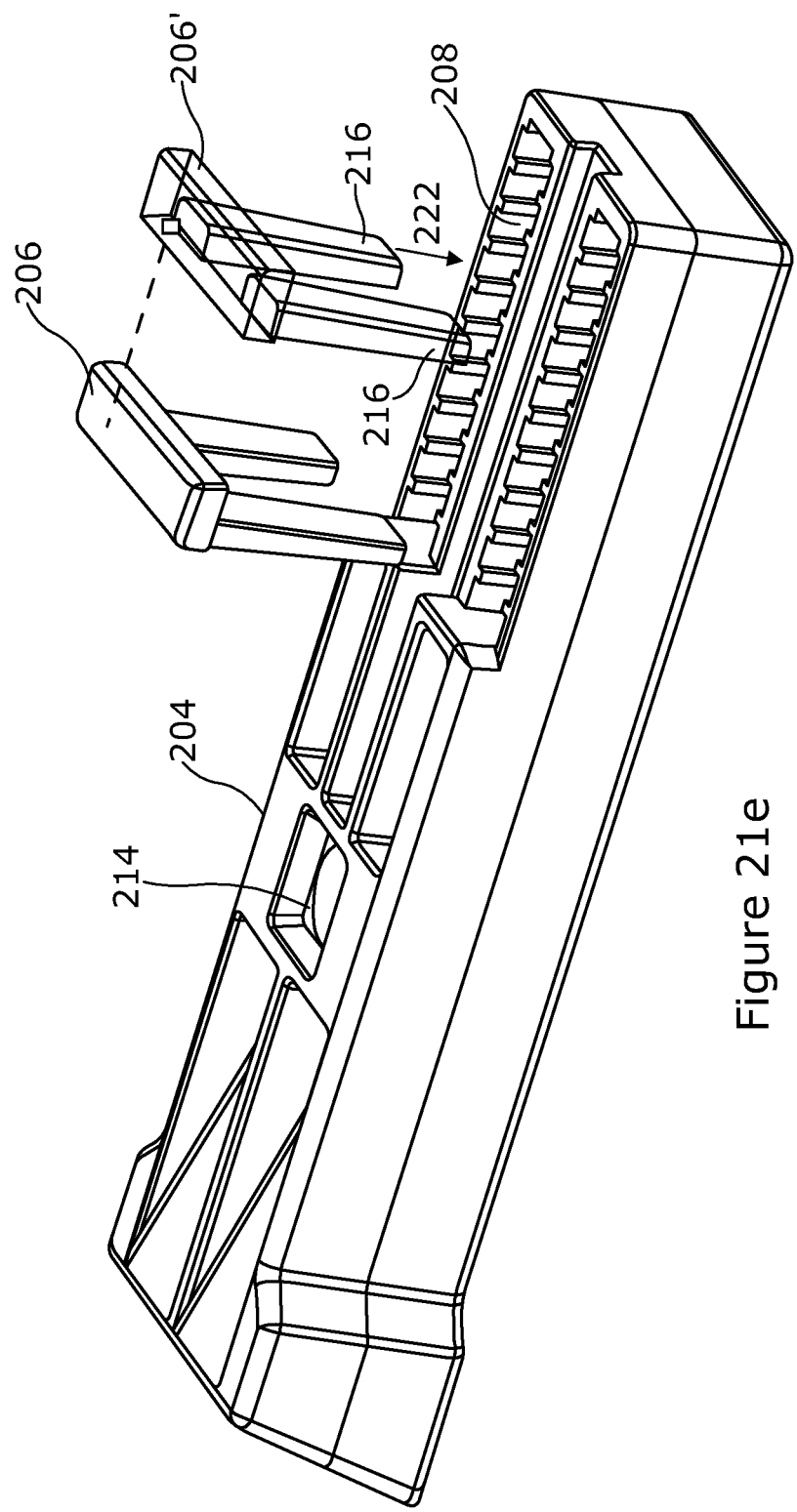
Figure 21F:
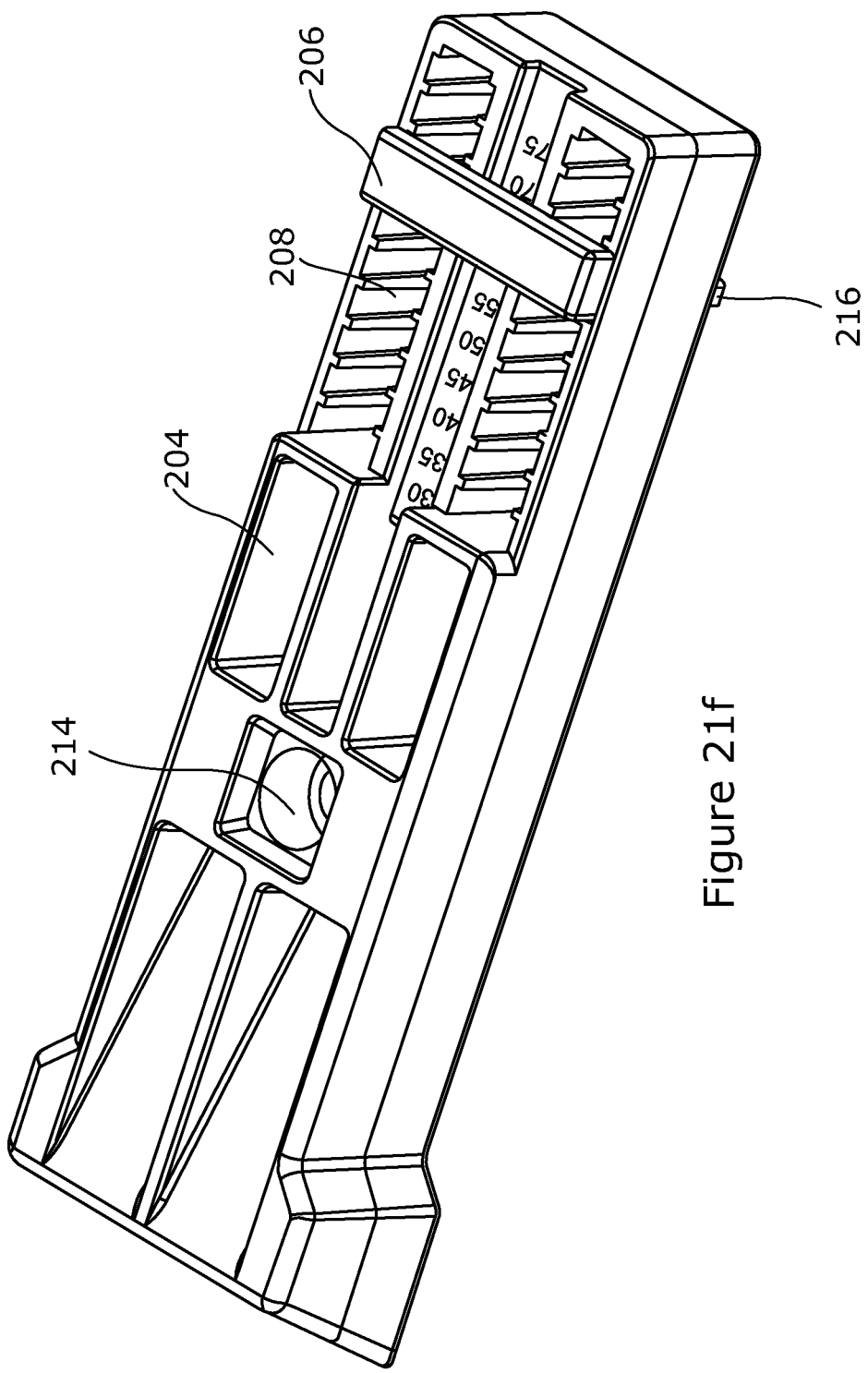

The movement of the part 206 with respect to the body 204 to allow the position of the same to be changed is illustrated in FIG. 21a in which the part 206 is moved upwardly out of the ports 212. 212' as indicated by arrow 218 so that the same is freed from the body 204 as shown. The part is then moved along the range of ports 212 as indicated by arrow 220 in FIG. 21d, with the user referring to the scale 208, until the desired new position for the part 206' is reached as shown in FIG. 21e. When the new position is reached the part 206 is moved towards the body as shown by arrow 222 to insert the leg portions 216 into the ports 212 to then hold the part 206 in the new position as shown in FIG. 21f.

A further embodiment of the jig apparatus 302 is shown in FIGS. 22a-e which show a first version with a body 304 with one passage 308 for the receipt of a drill bit therealong and a second version is shown in FIGS. 23a-e which illustrates a body 304 with two passages 308. The passages 308 pass from the top side of the body shown in FIGS. 22e and 23d through the body and through a slot 316 formed in the tray 306 as shown in FIGS. 22c and 23c. Apertures 318 are provided to allow the removal of dust and debris from the passages 308.

The apparatus 302 includes a tray portion 306 with which the body 304 is selectively positioned and engaged, in one embodiment by magnetic engagement means, or alternatively via ratchet engagement means which allow at least linear retention between the body 304 and tray portion 306. Once again location means 312 are provided to allow the jig apparatus to be used in conjunction with clamping means to clamp the apparatus in conjunction with the workpiece in which the hole is to be drilled using the jig apparatus and drill bit.

Typically the tray portion 306 includes guide means 310 which are selectively positionable therewith via releasable engagement means so as to allow the guide means to be moved between a storage position as shown in FIGS. 22a and 23a and an in use, guiding position, 310' as shown in broken lines in FIGS. 22b and 23b so that the same protrude below the underside of the tray portion 306 to be placed against an edge of the workpiece. The relative position of the body 304 and tray portion 306 is linearly adjustable so as, in turn, to adjust the position of the passage 308 and hence hole formed in the workpiece by adjusting the position of the body 304 with reference to the scale 314.

There is therefore provided in accordance with the invention jig apparatus which is provided of a form to allow for the faster and more accurate positioning, clamping and repositioning of the same.

The invention claimed is:

1. A jig apparatus for use with a drill bit and power means therefor to rotate said drill bit to form a hole in a workpiece with which the jig apparatus is positioned, said jig apparatus comprising: a body portion and a series of passages along a common axis at spaced intervals and through which the drill bit can be selectively inserted and into the workpiece to form the said holes in the workpiece, the said body portion includes first and second pairs of guide stops for selective movement with respect to the body portion whilst retained in position with the underside of the said body portion and the said first pair of guide stops are located closer to the passage centres than the said second pair of guide stops and the said guide stops are movable between a folded away position in the underside of the body portion and a folded out position in which the same protrude below the underside of the said body portion to be brought into contact with an edge of the workpiece so as to allow the said passages to be selectively positioned with respect to the workpiece edge at one of a first fixed spacing from the workpiece edge when the second pair of guide stops are folded out and engage with the workpiece edge and the first pair of guide stops are folded away, or a second fixed spacing from the workpiece edge when the first pair of guide stops are folded out and engage with the workpiece edge and the second pair of guide stops are folded away, so as to determine the position of the passages from the said edge to be one of said two possible fixed spacings with the first or the second pair of guides stops in contact with the said workpiece edge and said first spacing is greater than the said second spacing.

2. Apparatus according to claim 1 wherein at least one end of the body portion there is provided engagement means which allow two of said body portions to be joined together to form a combined body of the required length with respect to the workpiece.

3. Apparatus according to claim 1 wherein at least one sleeve is provided in the passages in the body and which forms the face of the passage adjacent the drill bit as it passes therethrough.

4. Apparatus according to claim 1, wherein the first pair of guide stops are positioned parallel to the second pair of guide stops.

5. Apparatus according to claim 1, wherein the first pair of guide stops are parallel to the common axis and the second pair of guide stops are parallel to the common axis.

* * * * *